(12) United States Patent
Takizawa

(10) Patent No.: US 7,800,896 B2
(45) Date of Patent: Sep. 21, 2010

(54) CONNECTING DEVICE AND ELECTRONIC APPARATUS SYSTEM

(75) Inventor: Tomohiro Takizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/043,711

(22) Filed: Mar. 6, 2008

(65) Prior Publication Data

US 2008/0232049 A1 Sep. 25, 2008

(30) Foreign Application Priority Data

Mar. 16, 2007 (JP) .............................. 2007-068527

(51) Int. Cl.
G06F 1/16 (2006.01)
(52) U.S. Cl. ........................... 361/679.41; 361/679.43; 710/303; 710/304
(58) Field of Classification Search .................. 361/686
See application file for complete search history.

(56) References Cited

U.S. PATENT DOCUMENTS

| 5,264,992 | A  | * | 11/1993 | Hogdahl et al. | ............ | 361/681 |
| 5,452,180 | A  | * | 9/1995  | Register et al. | ............ | 361/686 |
| 5,535,093 | A  | * | 7/1996  | Noguchi et al. | ............ | 361/686 |
| 6,898,080 | B2 | * | 5/2005  | Yin et al. | .................... | 361/686 |
| 7,200,702 | B2 | * | 4/2007  | Keely et al. | ................ | 710/303 |
| 7,492,579 | B2 | * | 2/2009  | Homer et al. | ............ | 312/223.1 |
| 2003/0223185 | A1 | * | 12/2003 | Doczy et al. | ................ | 361/680 |
| 2005/0207110 | A1 | * | 9/2005  | Wang et al. | .................. | 361/686 |
| 2005/0270731 | A1 | * | 12/2005 | Yin | ............................ | 361/681 |
| 2005/0280984 | A1 | * | 12/2005 | Huang et al. | ................ | 361/686 |
| 2006/0221565 | A1 | * | 10/2006 | Doherty et al. | ............ | 361/683 |
| 2006/0274495 | A1 | * | 12/2006 | Nakamura et al. | .......... | 361/686 |
| 2007/0083691 | A1 | * | 4/2007  | Keely et al. | ................ | 710/303 |

FOREIGN PATENT DOCUMENTS

| JP | 11-53052 | 2/1999 |
| JP | 2001-273050 | 10/2001 |

* cited by examiner

Primary Examiner—Jayprakash N Gandhi
Assistant Examiner—Anthony Q Edwards
(74) Attorney, Agent, or Firm—Staas & Halsey LLP

(57) ABSTRACT

A connecting device for detachably holding an electronic apparatus having a housing formed in a plate shape and serving as an interface for a signal input/output between the electronic apparatus and at least one external device. The connecting device includes a base portion and a support plate coupled with the base portion. The device includes a connector that can be provided on the surface of the support plate and to which the signal input/output terminal is connected and a guide member that is supported by the lower end of the support plate so as to freely turn in the direction of moving close to and away from the support plate with the lower end as the axis and that is in contact with both of a part of the lower end surface and a part of the back surface of the electronic apparatus when the electronic apparatus is attached.

8 Claims, 33 Drawing Sheets

CONNECTING DEVICE AND ELECTRONIC APPARATUS SYSTEM

CROSS-REFERENCE TO RELATED APPLICATIONS

This application is related to and claims the benefit of priority from the prior Japanese Patent Application No. 2007-68527 filed on Mar. 16, 2007, the entire contents of which are incorporated herein by reference.

BACKGROUND

1. Field of the Invention

The present invention relates to a connecting device which detachably holds an electronic apparatus provided with a display screen and serves as an interface for signal input/output between this electronic apparatus and an external device, and an electronic apparatus system provided with the electronic apparatus and the connecting device.

2. Description of Related Art

Recently, there have been developed and commercialized electronic apparatuses which are provided with a large display screen at the front of the housing and formed in a plate shape as a whole without having a keyboard and to which an instruction is inputted by bringing a pen into contact with or close to the display screen to make the position of the pen recognized. As such electronic apparatus, for example, a palm-sized type apparatus the processing power of which is limited, and a tablet type apparatus having a processing power as a personal computer (hereinafter, this tablet type apparatus is briefly referred to as a tablet PC) are known.

Such an electronic apparatus can have form and functions convenient for carrying the electronic apparatus, and it is assumed to be carried and that can be used inside and outside. Especially the tablet PC described above, however, is also assumed to be that can be used for a work on a desk because it can have processing power as a personal computer.

When such an electronic apparatus is that can be used on a desk, it is desirable to connect an external device such as a keyboard to the electronic apparatus to facilitate the work. However, in the form of directly connecting an external device to the electronic apparatus, the user has to attach or detach the external device to or from the electronic apparatus each time of switching between the use on a desk and the use while carrying the electronic apparatus, that is very troublesome.

For example, example embodiment, an electronic apparatus addressing this problem can be provided with a display screen is detachably held, and a docking station, that is a connecting device for serving as an interface for a signal input/output between this electronic apparatus and an external device, is that can be used to connect the electronic apparatus and an external device via this docking station. By using such a docking station, the user can easily perform switching between the use of the electronic apparatus on a desk and the use while carrying it.

At the lower part of the attached surface of the above docking station, a positioning member with a cross section formed in a U shape is attached in a manner that it can freely turn around an axis in the longitudinal direction. Therefore, this docking station makes it possible to easily and accurately attach the electronic apparatus by inserting the lower end part of the electronic apparatus into this positioning member to position the electronic apparatus and turn the positioning member around the axis from that state to get the back surface of the electronic apparatus in close contact with the attached surface.

This docking station can also be provided with a docking-station-side connector at the attached surface, and the electronic apparatus can be provided with an electronic-apparatus-side connector to be engaged with the docking-station-side connector on its back surface. Therefore, at the same time of getting the back surface of the electronic apparatus into contact with the attached surface of the docking station, the user can electrically connect the docking-station-side connector and the electronic-apparatus-side connector with each other.

SUMMARY

According to an example embodiment, a connecting device for detachably holding an electronic apparatus having a housing formed in a plate shape and serving as an interface for a signal input/output between the electronic apparatus and at least one external device with the connecting device includes a base portion, a support plate coupled with the base portion; a connector that can be provided on the surface of the support plate and to which the signal input/output terminal is connected—; and a guide member that is supported by the lower end of the support plate so as to freely turn in the direction of moving close to and away from the support plate with the lower end as the axis and that is in contact with both of a part of the lower end surface and a part of the back surface of the electronic apparatus when the electronic apparatus is attached.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION OF THE PREFERRED EMBODIMENTS

Figure 1:
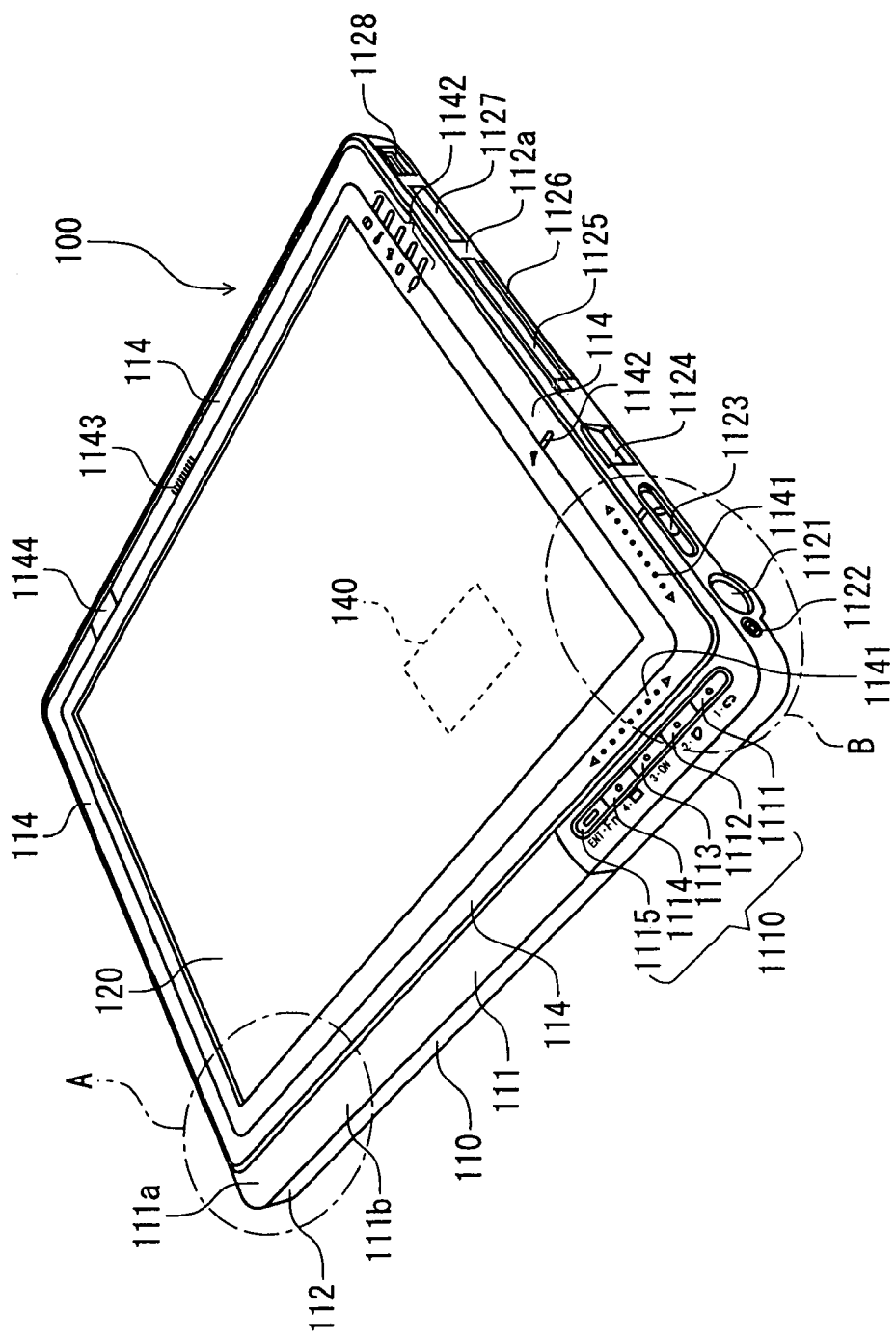
FIG. 1 illustrates an external perspective view of a tablet PC seen from obliquely upward on the front side.

Reference will now be made in detail to the example embodiments, examples of which are illustrated in the accompanying drawings, wherein like reference numerals refer to the like elements throughout. The example embodiments are described below to explain the present invention by referring to the figures.

In this embodiment, as an example of the electronic apparatus, a so-called tablet-type personal computer (hereinafter, briefly referred to as a tablet PC) will be described which is provided with a large display screen on the front surface of the housing (the upper surface in FIG. 1) and formed in a plate shape as a whole without having a keyboard and to which an instruction is inputted by bringing a dedicated pen into contact with or close to the display screen to make the position recognized.

Figure 2:
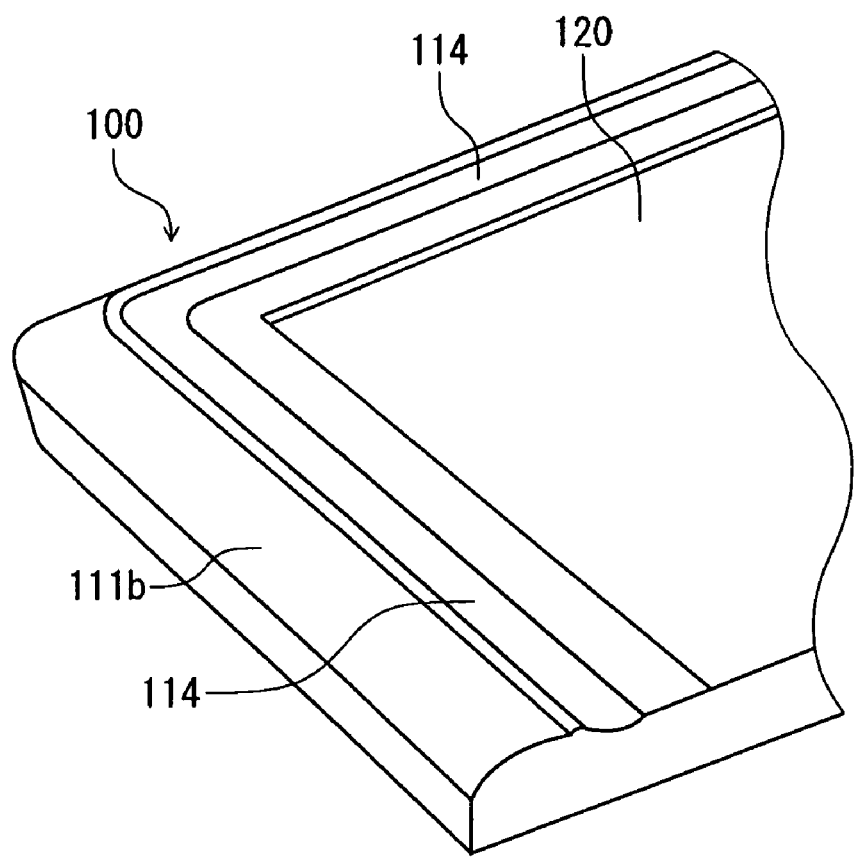
FIG. 2 illustrates an enlarged sectional view of section A shown in FIG. 1.
Figure 3:
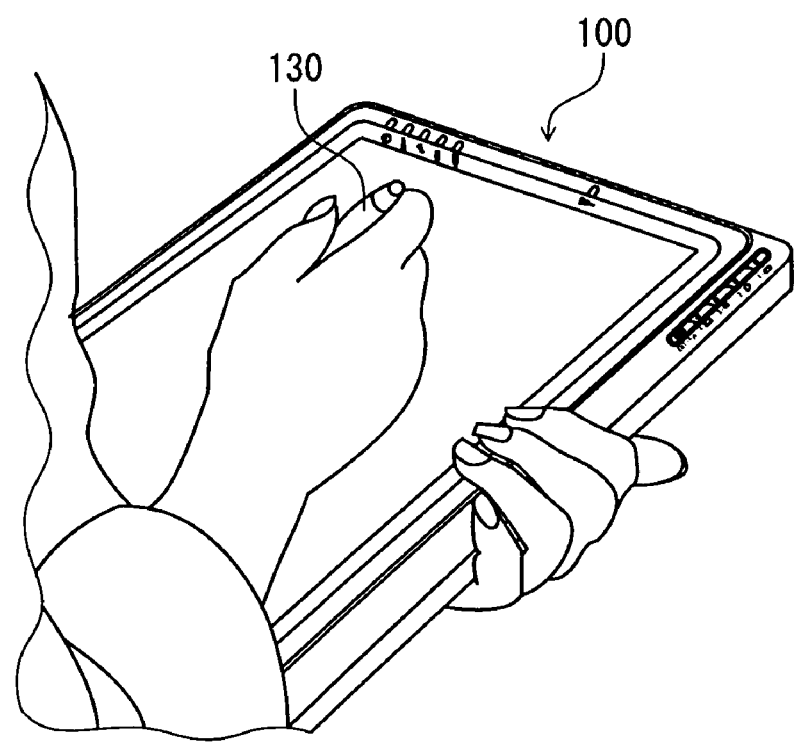
FIG. 3 illustrates an external perspective view showing an example state in which an operator holds the tablet PC shown in FIG. 1.
Figure 4:
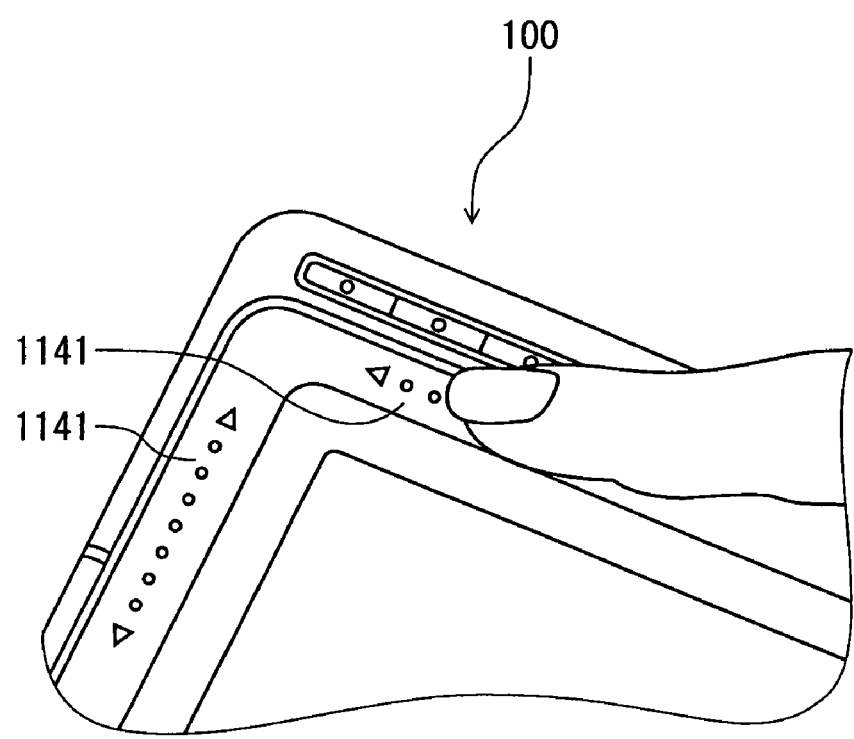
FIG. 4 illustrates an enlarged external perspective view of section B shown in FIG. 1.

FIG. 1 is an external perspective view of a tablet PC 100 when it is seen from obliquely upward on the front side. FIG. 2 is an enlarged sectional view of an A part shown in FIG. 1. FIG. 3 is an external perspective view showing a state in which a user holds the tablet PC 100 shown in FIG. 1. FIG. 4 is an enlarged external perspective view of a B part shown in FIG. 1.

The tablet PC 100 shown in FIG. 1 has a processing power similar to that of a common personal computer and includes a hard disk device and a CPU (Central Processing Unit).

Furthermore, this tablet PC 100 is also provided with a housing 110 having an external form in a plate shape and configured by a member made of resin, and a display screen 120 arranged on an area excluding a peripheral area 111a adjacent to a side surface 112 on a front surface (the upper surface in FIG. 1) 111 of this housing 110, as shown in FIG. 1. This display screen 120 has a pen input function provided with an electromagnetic-induction digitizer, for detecting contact or closeness of a dedicated pen 130 (see FIG. 3). A resistive digitizer, which is a so-called touch panel, may be adopted as this input function.

As shown in FIGS. 1 and 2, the peripheral area 111a of the front surface 111 of the housing 110 has a groove part 114 formed along the circumference of this peripheral area 111a, and a partial area 111b spreading at the lower side of this groove part 114.

Therefore, as shown in FIG. 3, the groove part 114 functions as a finger hook when a user holds the tablet PC 100, and thereby, a good holding condition can be obtained no matter which direction the display screen 120 is pointed at when the user holds the tablet PC 100.

As shown in FIGS. 1 and 4, on this groove part 114, there are arranged detectors 1141 for detecting scroll information corresponding to a sliding operation by the user at both of a part where the groove of the groove part 114 extends in the longitudinal direction and a part where the groove extends in the lateral direction near the lower right corner among the four corners of the display screen 120. The detectors 1141 detect both of scroll information corresponding to a sliding operation with a finger by the user and scroll information corresponding to a sliding operation with the dedicated pen 130 by the user. A display controller 140 for scrolling an image displayed on the display screen 120 in response to detection of the scroll information by the detector 1141 is included in the housing 110.

Thus, the user can recognize the positions of the detectors 1141 without seeing his hands and intuitively perform a scroll operation. Consequently, an excellent operability is realized. Furthermore, it is possible to perform a scroll operation both with a finger and with the dedicated pen 130, which is very convenient. Furthermore, this embodiment can reduce the possibility of performing a wrong operation in comparison with the case where the detector is provided at a projected part.

At an upper part and the central part of the right side of the groove part 114, there are arranged status display LEDs (Light Emitting Diodes) 1142 which indicate various statuses of the tablet PC 100. At the central part of the top side of the groove part 114, there is arranged a speaker 1143. At the left side of this speaker 1143, there is arranged a receiver 1144 which receives an infrared signal from a wireless keyboard to be described later.

As shown in FIG. 1, there are arranged five push-button type SECURITY/TABLET buttons 1110 at the right-side part of the partial area 111*b* spreading at the lower side of the groove part 114, on the peripheral area 111*a* of the front surface 111 of the housing 110. These five SECURITY/TABLET buttons 1110 are arranged in parallel in the order of a first button 1111, a second button 1112, a third button 1113, a fourth button 1114, an ENT button 1115 from the right side.

Each of the first button 1111, the second button 1112, the third button 1113 and the fourth button 1114 is a button used when the user inputs a password when logging in. The ENT button 1115 is a button used when the inputted password is determined.

By continuing to press the first button 1111 for two seconds or more after activating the tablet PC 100, the tablet PC 100 executes processing similar to the processing performed when the Ctrl key, the Alt key and the Del key are pressed at the same time on a common keyboard to forcibly terminate the system.

Each time the second button 1112 is pressed after the tablet PC 100 is activated, the tablet PC 100 turns the direction of the whole image displayed on the display screen 120 by 90 degrees. Thus, the user can use this display screen 120 both in the longitudinal and lateral directions.

As described above, the tablet PC 100 is provided with the groove part 114 which functions as a finger hook. Therefore, even if the user changes the direction of the whole image displayed on the display screen 120 to a desired direction and changes the direction of the display screen 120 to any of the longitudinal and lateral directions, he can use the tablet PC 100 in a good holding condition.

The third button 1113 and the fourth button 1114 are buttons to which the user can assign desired functions. When the user presses the third button 1113 or the fourth button 1114 to which a predetermined function is assigned in advance and then presses the ENT button 1115 after activating the tablet PC 100, the tablet PC 100 executes the function assigned to the third button 1113 or the fourth button 1114. The ENT button 1115 corresponds to the Enter key on a common keyboard.

As shown in FIG. 1, the housing 110 is provided with a pen storage slot 1121 for storing the dedicated pen 130 described above, and a strap hole 1122 for attaching a strap attached to the dedicated pen 130, on a right side surface 112*a* on the right side of the side surface 112. The housing 110 is also provided with a sliding-type power button 1123 for turning on/off the main power source, on this right side surface 112*a*. Furthermore, the housing 110 is also provided with a fingerprint sensor 1124 for identifying a fingerprint to perform user authentication, a PC card slot 1125 into which a PC card not shown is to be inserted, a smart card slot 1126 into which a smart card not shown is to be inserted, an SD memory card slot 1127 into which an SD memory card not shown is to be inserted, and a first USB connector 1128 to which a USB (Universal Serial Bus) cable not shown is to be connected, on this right side surface 112*a*.

Figure 5:
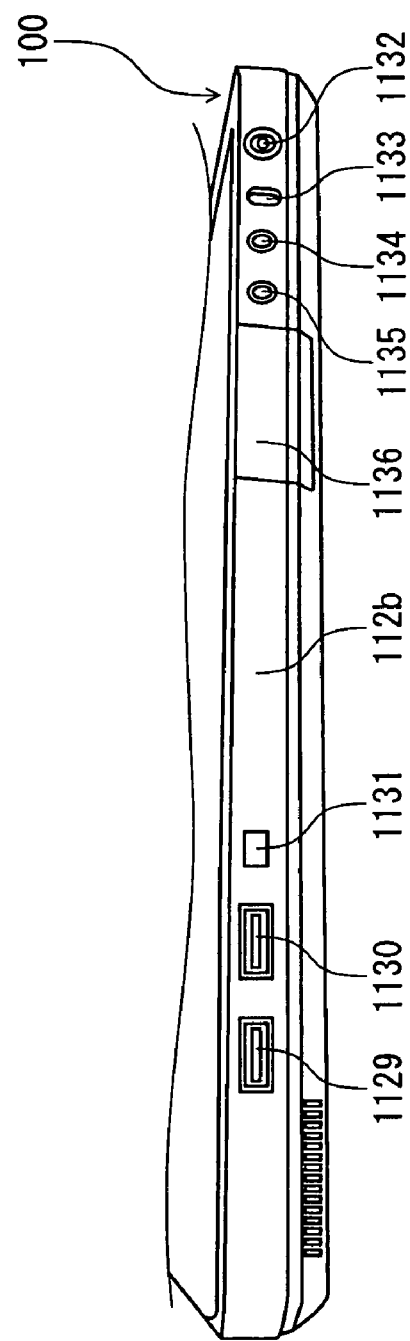
FIG. 5 illustrates a top side surface showing the tablet PC shown in FIG. 1 when it is seen from the top side surface.

FIG. 5 is diagram of a top side surface showing the tablet PC 100 shown in FIG. 1 when it is seen from the top side surface.

As shown in FIG. 5, the housing 110 is provided with a second USB connector 1129 and a third USB connector 1130 to which a USB cable not shown is to be connected, and an IEEE 1394 port 1131 to which an IEEE 1394 cable not shown is to be connected, on a top side surface 112*b* on the top side of the side surface 112. The housing 110 is also provided with an power connector 1132 to which a power cable not shown for supplying power to the tablet PC 100 is to be connected, on the top side surface 112*b*. Furthermore, the housing 110 is also provided with a security wire lock slot 1133 for fixing a security wire not shown, a headphone jack 1134 to which a headphone not shown is to be connected, a microphone jack 1135 to which a microphone not shown is to be connected, and an external display jack to which the VGA connector of a cable connected to an external display not shown is to be connected, on the top side surface 112*b*. This external display jack is covered by a port cover 1136.

Figure 6:
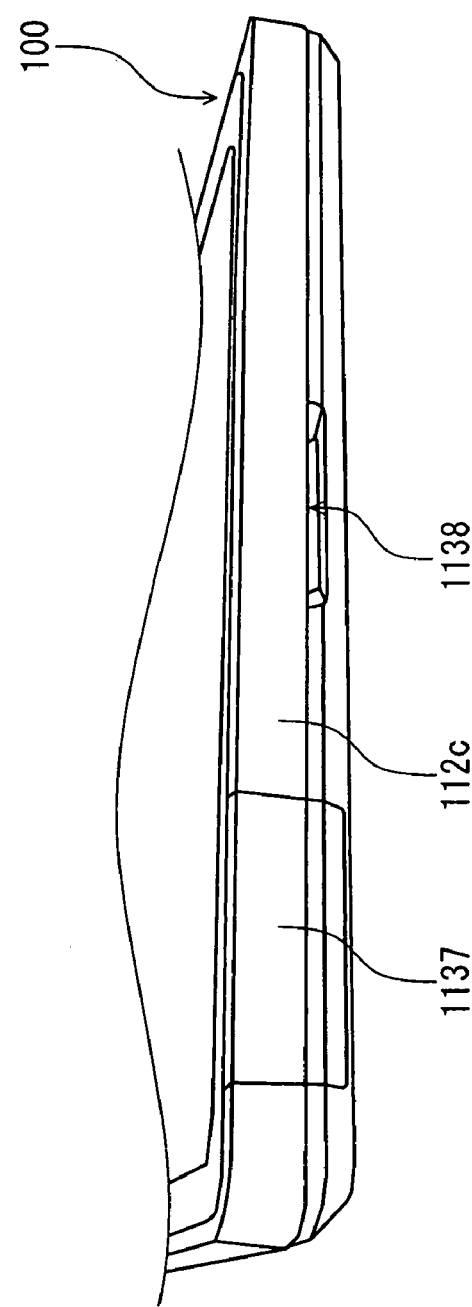
FIG. 6 illustrates a left side surface showing the tablet PC shown in FIG. 1 when it is seen from the left side surface.

FIG. 6 is a diagram of a left side surface showing the tablet PC 100 shown in FIG. 1 when it is seen from the left side surface.

As shown in FIG. 6, the housing 110 is provided with a LAN (Local Area Network) connector to which a LAN cable not shown is to be connected, and a modem connector to which a modular cable not shown is to be connected, on a left side surface 112*c* on the left side of the side surface 112. The LAN connector and the modem connector are covered by a connector cover 1137. Furthermore, the housing 110 is provided with a recess 1138 to be engaged with an engage portion 341 provided at a guide member 340 of a docking station 300 to be described later, on this left side surface 112*c*.

Figure 7:
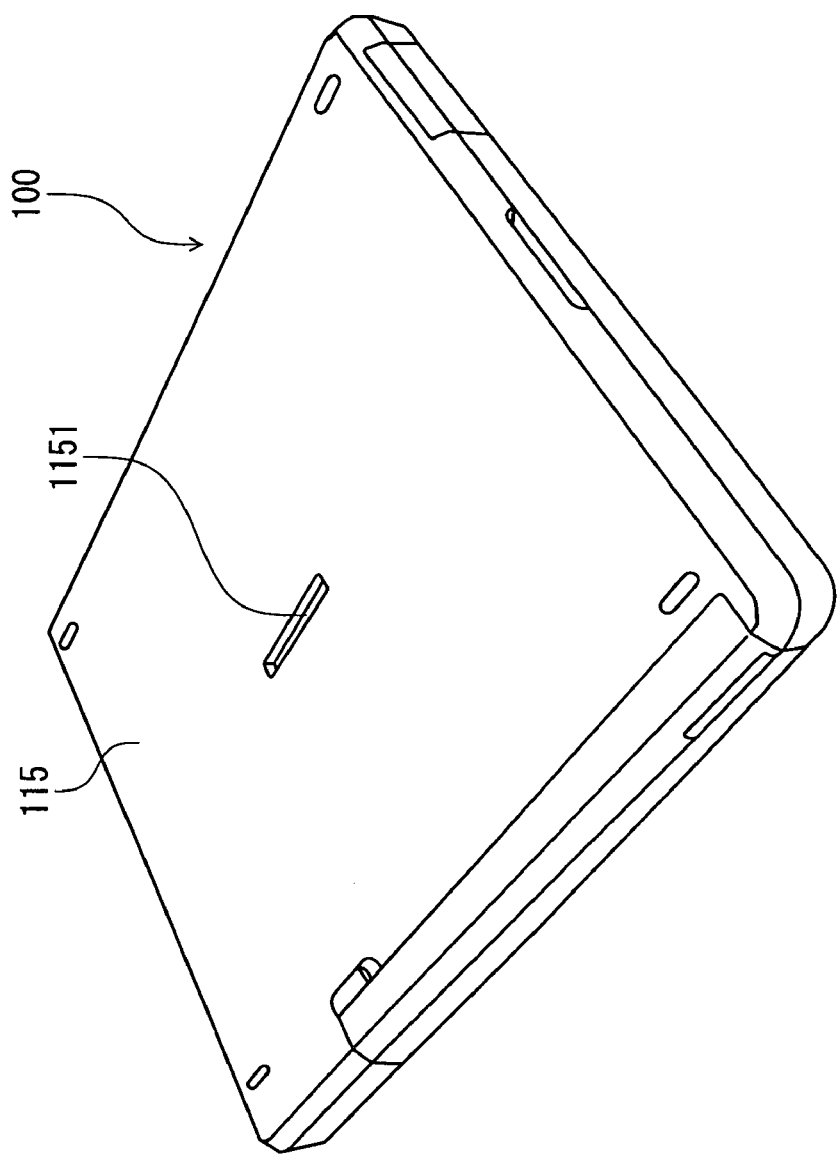
FIG. 7 illustrates an external perspective view of the tablet PC shown in FIG. 1 when it is seen from obliquely upward on the back side.

FIG. 7 is an external perspective view of the tablet PC 100 shown in FIG. 1 when it is seen from obliquely upward on the back side.

As shown in FIG. 7, the housing 110 is provided with a docking station connector 1151 for connecting the docking station 300 (see FIG. 14) to be described later, at a back surface (the lower surface in FIG. 7) 115.

Figure 8:
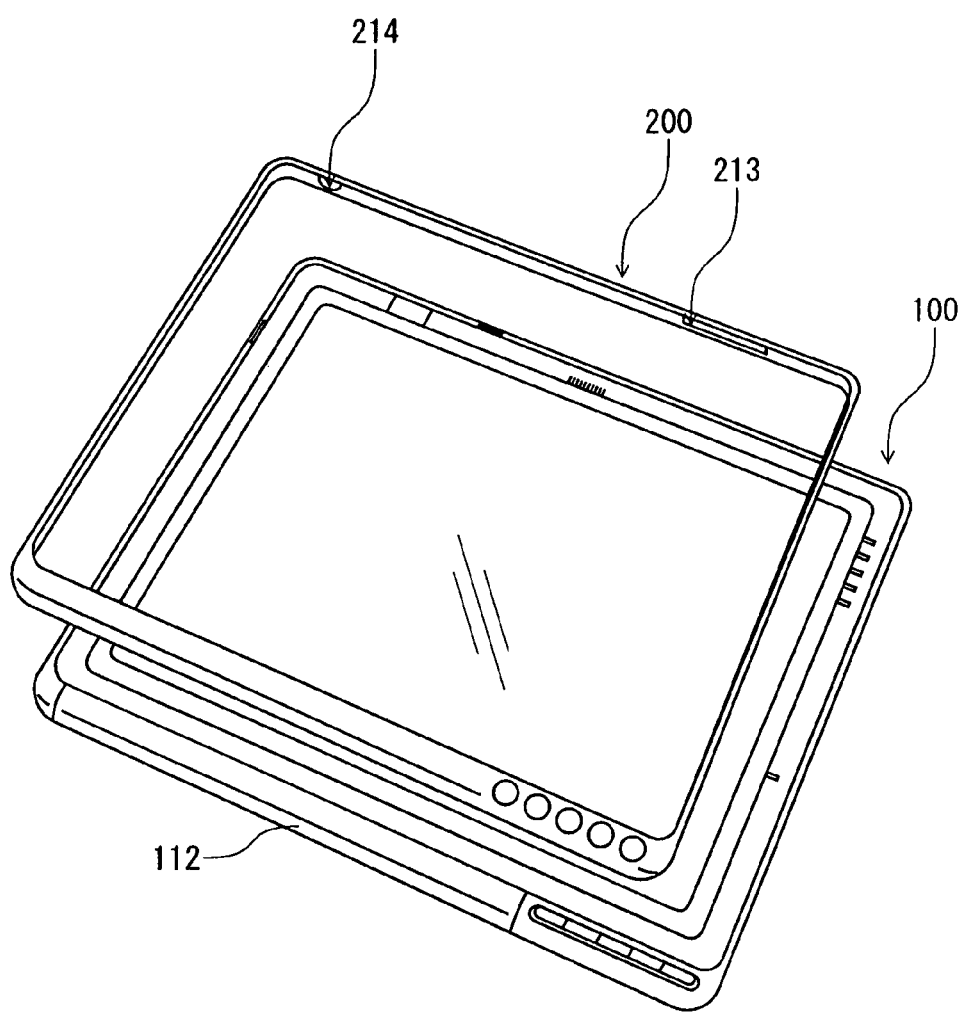
FIG. 8 illustrates an external perspective view of the tablet PC shown in FIG. 1 and a housing protective cover to be attached to the tablet PC when they are seen from obliquely upward on the front side.
Figure 9:
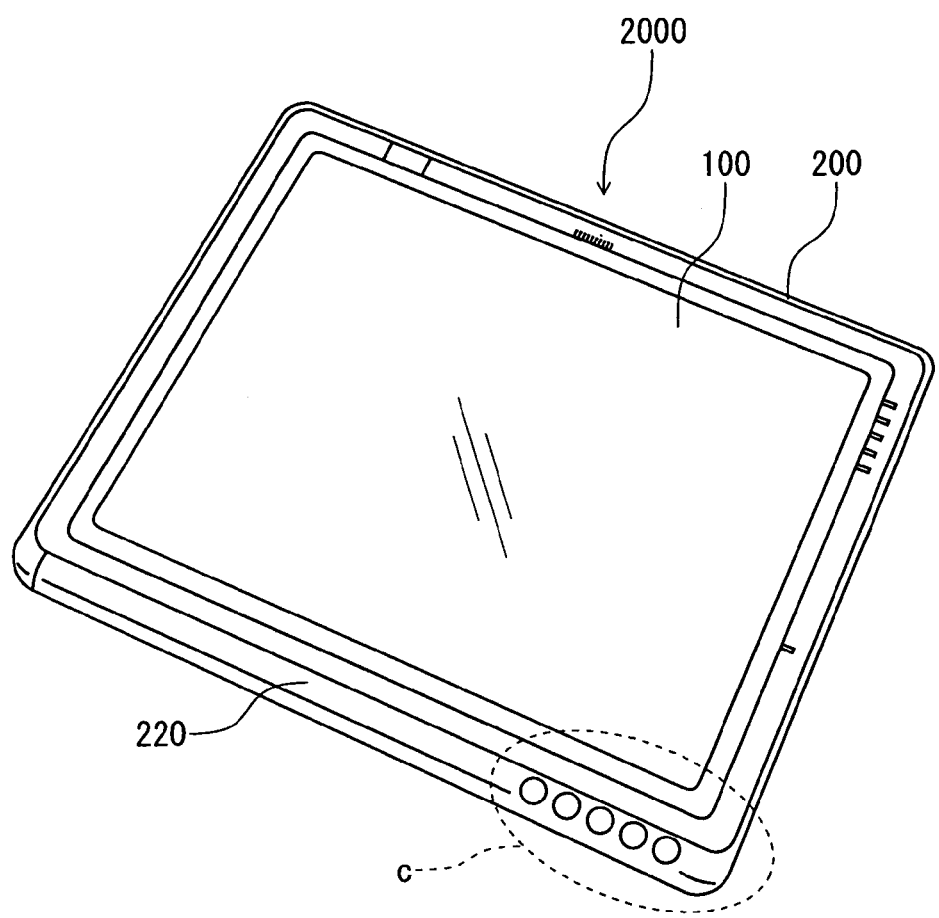
FIG. 9 illustrates an external perspective view of an electronic apparatus system with the housing protective cover shown in FIG. 8 attached to the tablet PC when it is seen from obliquely upward on the front side.

FIG. 8 is an external perspective view of the tablet PC 100 shown in FIG. 1 and a housing protective cover 200 to be attached to the tablet PC 100 when they are seen from obliquely upward on the front side. FIG. 9 is an external perspective view of an electronic apparatus system 2000 with the housing protective cover 200 shown in FIG. 8 attached to the tablet PC 100 when it is seen from obliquely upward on the front side.

As shown in FIGS. 8 and 9, the housing protective cover 200 can be freely attached to and detached from the tablet PC 100 described with reference to FIGS. 1 to 7, and it has a part which surrounds the circumference of the side surface 112 of the housing 110 of this tablet PC 100 and is configured by an elastic member.

Therefore, by attaching this housing protective cover 200 to the tablet PC 100, the impact of a falling, a collision and the like to the tablet PC 100 can be reduced without causing deterioration of its operability and portability, and the tablet PC 100 is protected from such an impact. Especially, since the housing protective cover 200 is an elastic member, the impact of a falling, a collision and the like can be efficiently absorbed by the housing protective cover 200 being elastically deformed. Furthermore, since the housing 110 is a member made of resin and the housing protective cover 200 configured by an elastic member with a higher friction coefficient than that of a resin member is attached to the tablet PC 100, the good holding condition of the tablet PC 100 is improved. This housing protective cover 200 can be freely attached to and detached from the tablet PC 100, and the user can select whether to attach or detach the housing protective cover 200 according to the use environment. Thereby, it is possible to prevent the tablet PC 100 from becoming large-sized. Furthermore, by attaching this housing protective cover 200 to the tablet PC 100, the design image of the tablet PC 100 can be changed.

Figure 10:
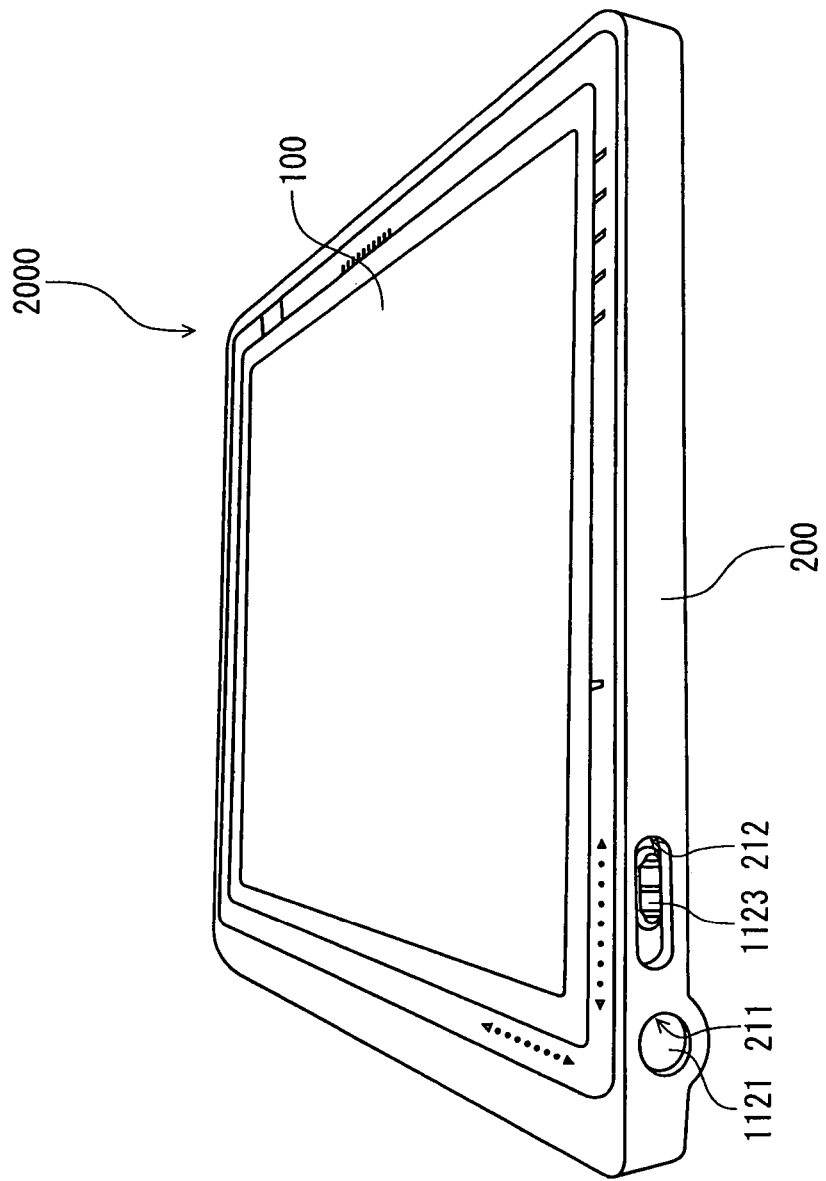
FIG. 10 illustrates an external perspective view of the electronic apparatus system shown in FIG. 9 when it is seen from obliquely upward on the front right side.
Figure 11:
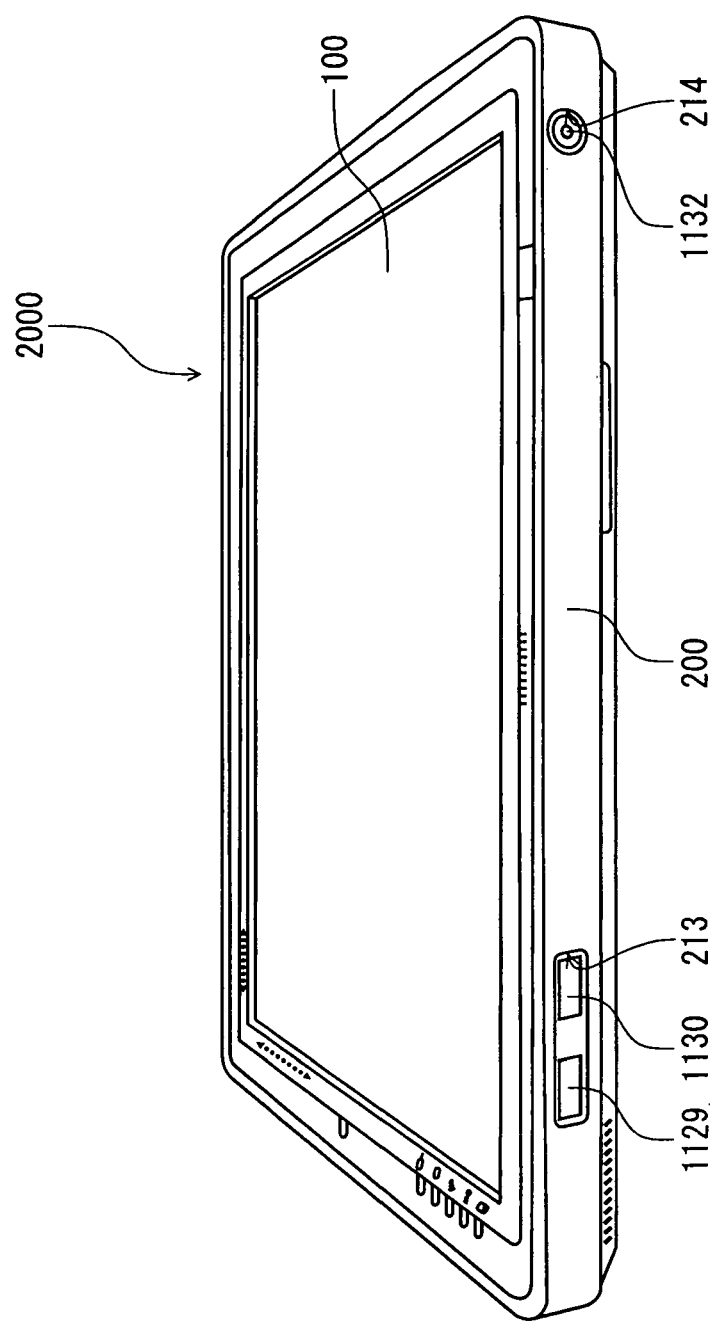
FIG. 11 illustrates an external perspective view of the electronic apparatus system shown in FIG. 9 when it is seen from obliquely upward on the front top side.
Figure 12:
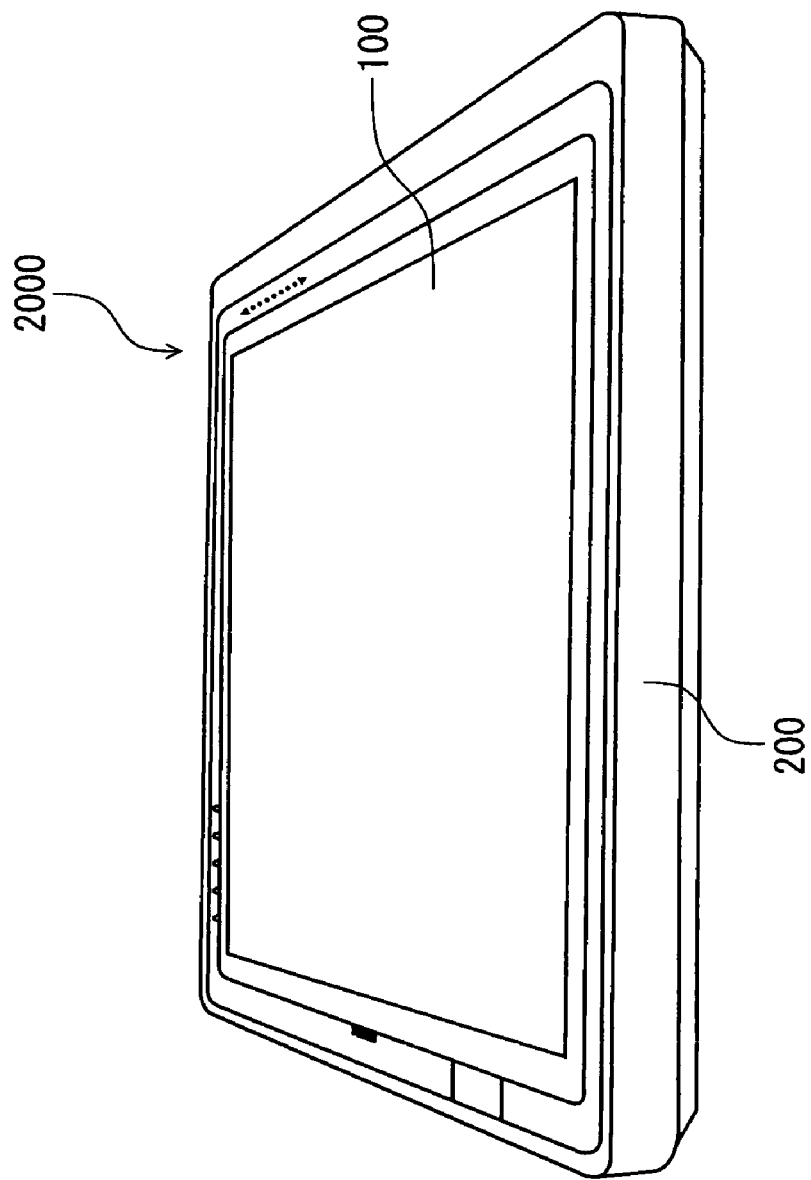
FIG. 12 illustrates an external perspective view of the electronic apparatus system shown in FIG. 9 when it is seen from obliquely upward on the front left side.

FIG. 10 is an external perspective view of the electronic apparatus system 2000 shown in FIG. 9 when it is seen from obliquely upward on the front right side. FIG. 11 is an external perspective view of the electronic apparatus system 2000 shown in FIG. 9 when it is seen from obliquely upward on the front top side. FIG. 12 is an external perspective view of the electronic apparatus system 2000 shown in FIG. 9 when it is seen from obliquely upward on the front left side.

As shown in FIGS. 10 to 12, this housing protective cover 200 covers the fingerprint sensor 1124, the PC card slot 1125, the smart card slot 1126, the SD memory card slot 1127 and the first USB connector 1128 which are arranged on the right side surface 112a on the side surface 112 of the housing 110 shown in FIG. 1. The housing protective cover 200 covers the IEEE 1394 port 1131, the security wire lock slot 1133, the headphone jack 1134, the microphone jack 1135 and the port cover 1136 which are arranged on the top side surface 112b of the side surface 112 of the housing 110 shown in FIG. 5. Furthermore, the housing protective cover 200 covers the connector cover 1137 arranged on the left side surface 112c of the side surface 112 of the housing 110 shown in FIG. 6. It is assumed that the use frequency of these connectors is relatively low in comparison with other connectors provided for the tablet PC 100.

As shown in FIGS. 10 to 12, this housing protective cover 200 is provided with a first opening 211 for exposing the pen storage slot 1121 arranged on the right side surface 112a of the side surface 112 of the housing 110 and a second opening 212 for exposing the power button 1123 arranged on the right side surface 112a. Furthermore, this housing protective cover 200 has a third opening 213 for exposing both of the second USB connector 1129 and the third USB connector 1130 arranged on the top side surface 112b of the side surface 112 of the housing 110 and a fourth opening 214 for exposing the power connector 1132 arranged on the top side surface 112b. It is assumed that the use frequency of these connectors is relatively high in comparison with other connectors provided for the tablet PC 100.

As described above, the housing protective cover 200 covers the connectors the use frequency of which is assumed to be relatively low among the multiple connectors arranged on the side surface 112 of the housing 110, and it has the first opening 211, the second opening 212, the third opening 213 and the fourth opening 214 for exposing the connectors the use frequency of which is assumed to be relatively low. Therefore, by attaching this housing protective cover 200 to the tablet PC 100, the connectors the use frequency of which is assumed to be relatively low are protected from dust and moisture. Even while the housing protective cover 200 is attached to the tablet PC 100, the user can use the pen storage slot 1121, the power button 1123, the second USB connector 1129, the third USB connector 1130 and the power connector 1132 the use frequency of which is assumed to be relatively high.

Figure 13:
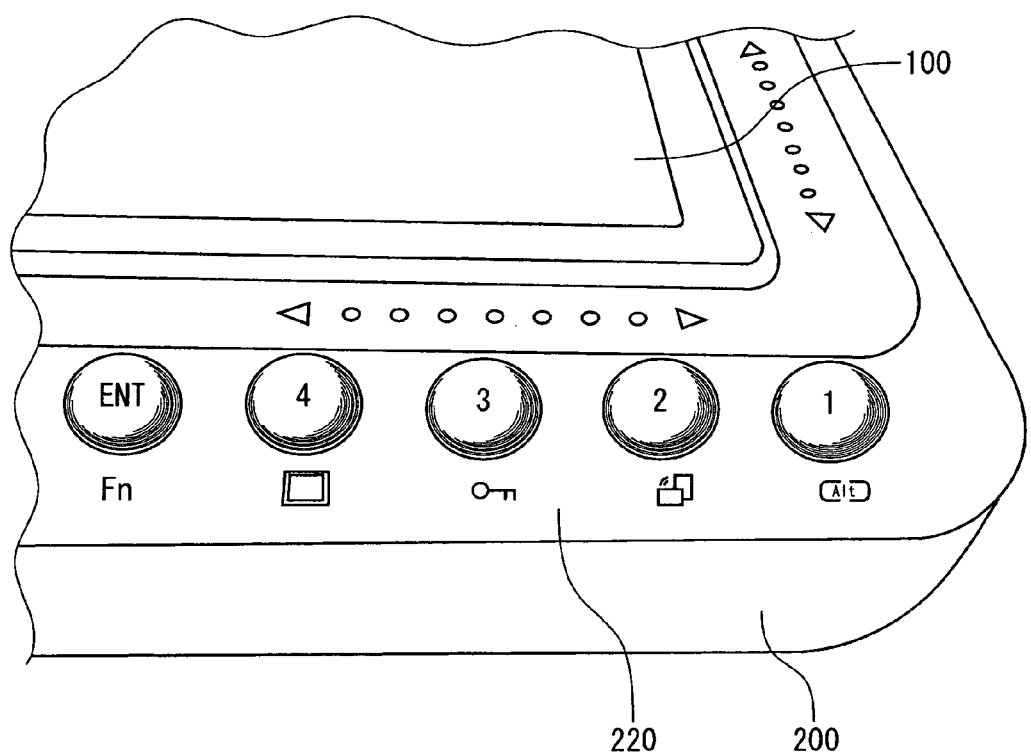
FIG. 13 illustrates an enlarged external perspective view of section C shown in FIG. 9.

FIG. 13 is an enlarged external perspective view of a C part shown in FIG. 9.

As shown in FIGS. 9 and 13, this housing protective cover 200 has a front surface cover portion 220 which covers the partial area 111b of the front surface 111 of the housing 110 where the five SECURITY/TABLET buttons 1110 are arranged. This front surface cover portion 220 has, immediately above each of the first button 1111, the second button 1112, the third button 1113, the fourth button 1114 and the ENT button 1115, which are the five SECURITY/TABLET buttons 1110 covered by the front surface cover portion 220, a bulge for pressing each of the SECURITY/TABLET buttons 1110 in response to a pressing operation by the user.

Therefore, even when the housing protective cover 200 is attached to the tablet PC 100, the user can recognize the position of each of the SECURITY/TABLET buttons 1110 and press it with a good operability. Furthermore, by this housing protective cover 200 being attached to the tablet PC 100, each of the SECURITY/TABLET buttons 1110 can be protected from dust and moisture.

Figure 14:
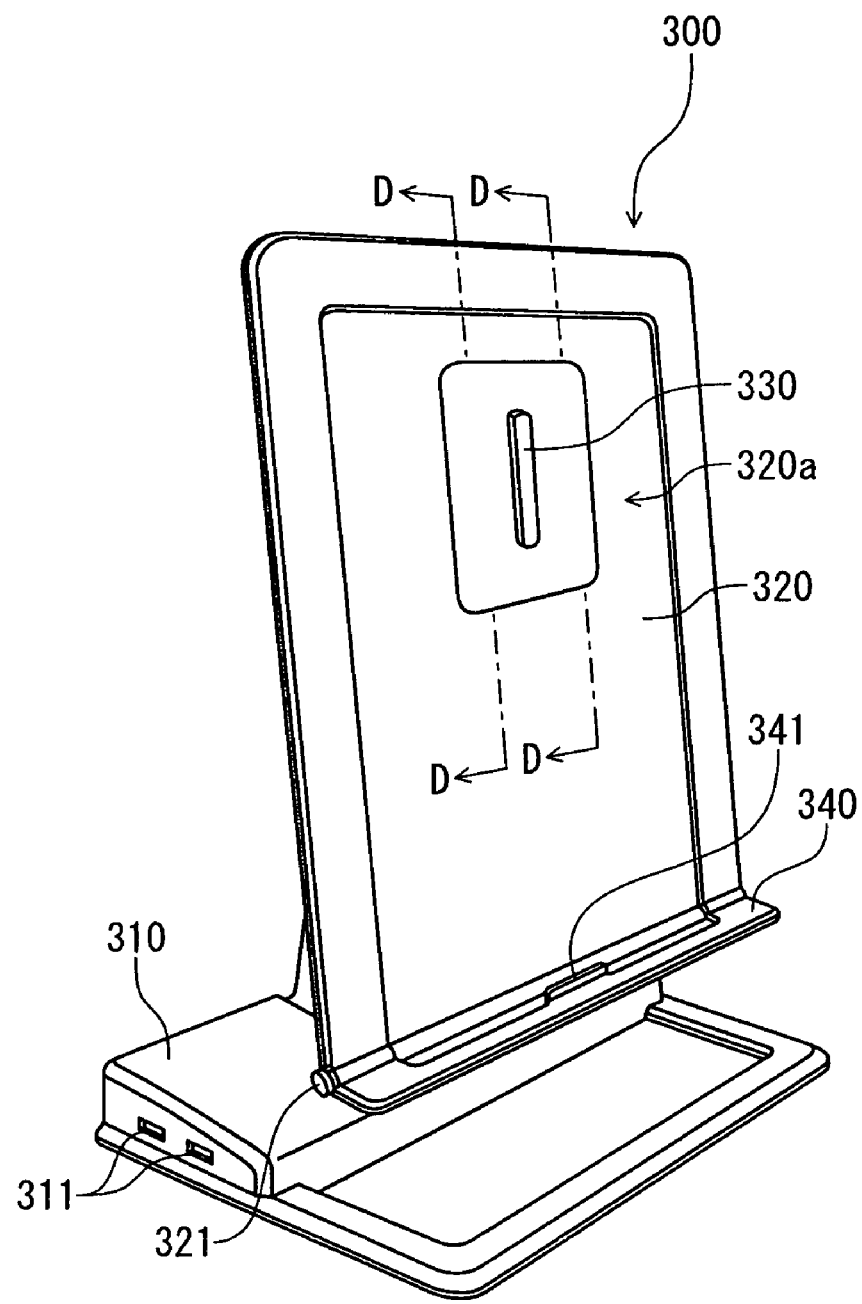
FIG. 14 illustrates an external perspective view of a docking station when it is seen from obliquely upward on the front side.

FIG. 14 is an external perspective view of a docking station 300 when it is seen from obliquely upward on the front side.

The docking station 300 shown in FIG. 14 detachably holds the tablet PC 100 described with reference to FIGS. 1 to 7, and it is a connecting device for intermediating signal input/output between the tablet PC 100 and an external device not shown.

This docking station 300 is provided with a base portion 310, a support plate 320, a connector 330 and a guide member 340.

The base portion 310 is provided with two USB connectors 311 and 312 to which a USB cable not shown is to be connected.

Figure 15:
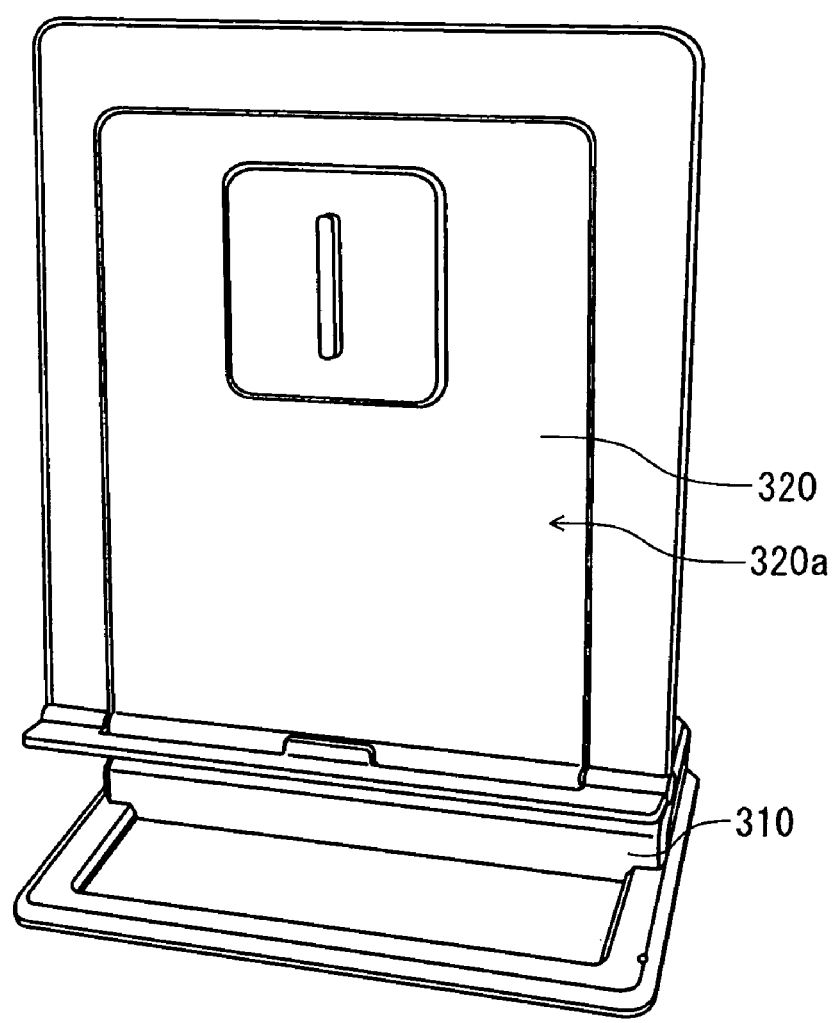
FIG. 15 illustrates an external perspective view of the docking station longitudinally holding the tablet PC when it is seen from obliquely upward on the front side.
Figure 16:
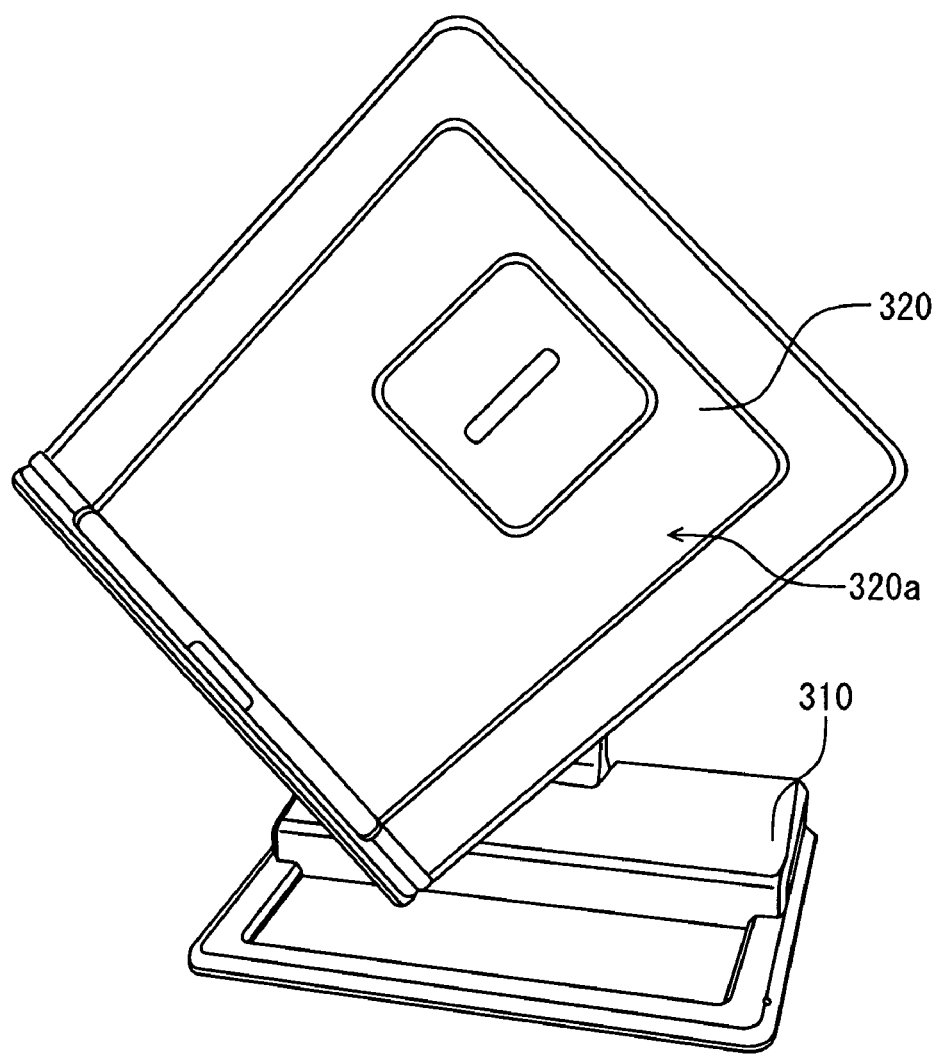
FIG. 16 illustrates an external perspective view of the docking station during a process of transition from the state of longitudinally holding the tablet PC to the state of laterally holding it when it is seen from obliquely upward on the front side.
Figure 17:
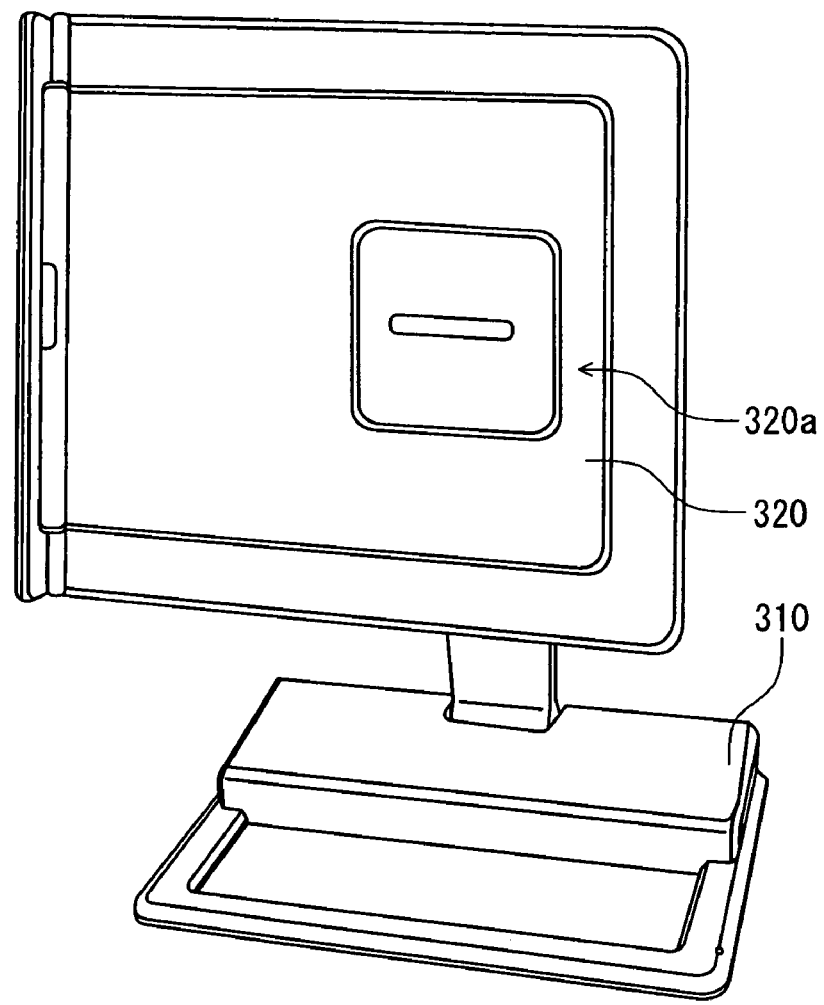
FIG. 17 illustrates an external perspective view of the docking station laterally holding the tablet PC when it is seen from obliquely upward on the front side.

FIG. 15 is an external perspective view of the docking station 300 longitudinally holding the tablet PC 100 when it is seen from obliquely upward on the front side. FIG. 16 is an external perspective view of the docking station 300 during a process of transition from the state of longitudinally holding the tablet PC 100 to the state of laterally holding it when it is seen from obliquely upward on the front side. FIG. 17 is an external perspective view of the docking station 300 laterally holding the tablet PC 100 when it is seen from obliquely upward on the front side.

As shown in FIGS. 15 to 17, the support plate 320 is coupled with the base portion 310 in a manner that it can freely turn around the perpendicular line to a front surface 320a of this support plate 320.

Therefore, when the tablet PC 100 the display screen 120 of which can be used in both longitudinal and lateral directions is attached to the docking station 300, the user can select the direction of the support plate 320 according to the direction of the whole image displayed on the display screen 120, which is very convenient.

Figure 18:
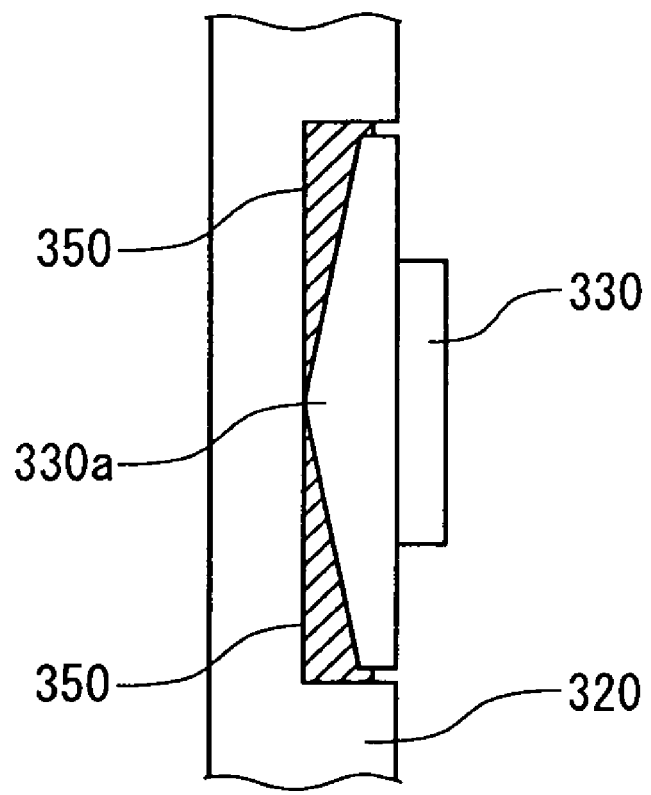
FIG. 18 illustrates longitudinal sectional view along a line D-D in FIG. 14.

FIG. 18 is a longitudinal sectional view along a line D-D in FIG. 14.

As shown in FIG. 14, the connector 330 is arranged on the front surface 320a of the support plate 320, and the docking station connector 1151 arranged on the back surface 115 of the tablet PC 100 shown in FIG. 7 is connected thereto. As shown in FIG. 18, the back surfaces 330a on both sides of the connector 330 are formed in a mountain shape and embedded in the support plate 320 with an elastic member 350 arranged between them. Thereby, the connector 330 is arranged on the support plate 320 in a manner that it can freely tilt in the same direction as the turning direction of the tablet PC 100 guided by the guide member 340 to be described later.

Thus, since the freedom of connection between the connector 330 which is the docking-station-side connector and the docking station connector 1151 which is the-tablet-PC-side connector is high, the connection can be smoothly performed.

The base portion 310 is provided with the USB connectors 311 and 312 to make it possible to connect external devices to the USB connectors 311 and 312 via USB cables in advance. Thereby, the necessity of directly attaching or detaching the external device to or from the tablet PC 100 at each time of switching between the use of the tablet PC 100 on a desk and the use while carrying the tablet PC 100 is eliminated, and the tablet PC 100 is connected to the external devices by being attached to the docking station 300. Therefore, switching between the use of the tablet PC 100 on a desk and the use of the tablet PC 100 while carrying it can be easily performed, which is very convenient.

Figure 19:
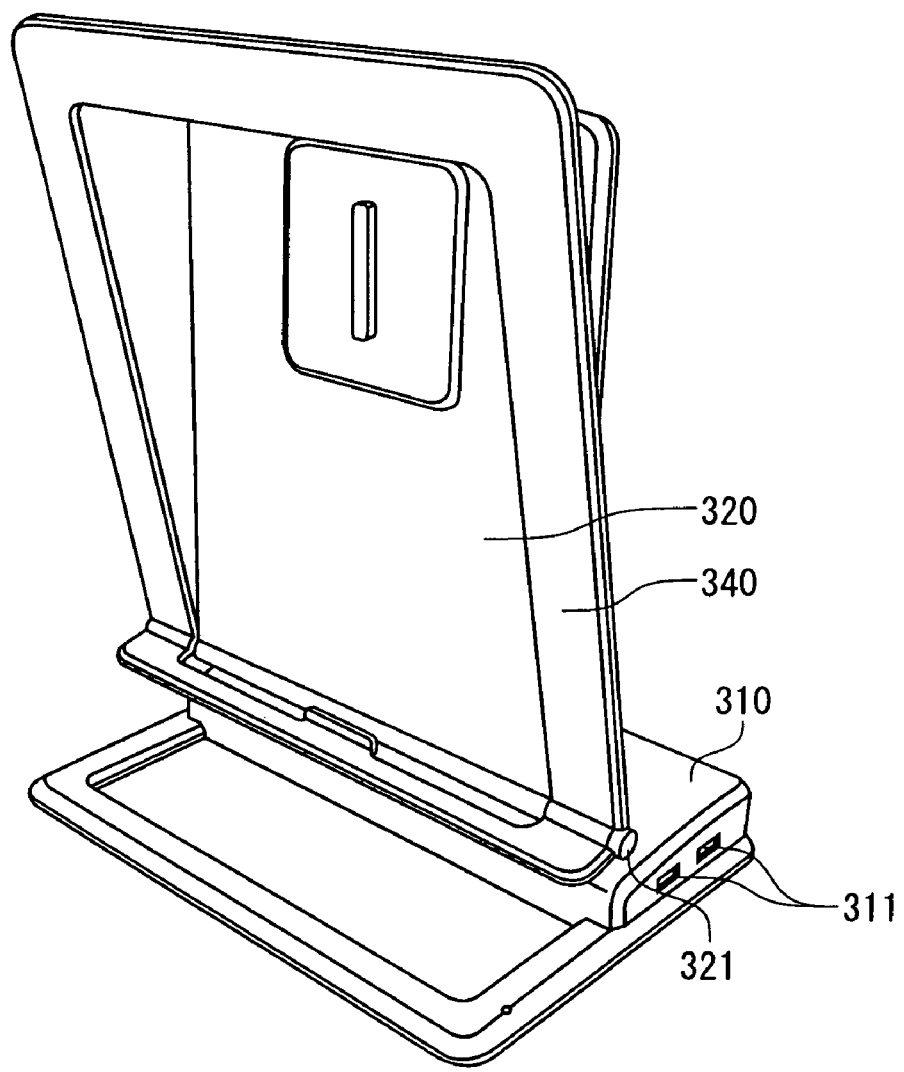
FIG. 19 is an external perspective view showing the state of the guide member of the docking station shown in FIG. 14 being turned when it is seen from obliquely upward on the front side.

FIG. 19 is an external perspective view showing the state of the guide member 340 of the docking station 300 shown in FIG. 14 being turned when it is seen from obliquely upward on the front side.

As shown in FIGS. 14 and 19, the guide member 340 is supported by a lower end 321 of the support plate 320 in a manner that it can freely turn in the direction of moving close to and away from the support plate 320 with this lower end 321 as an axis. The guide member 340 has an engage portion 341 to be engaged with the recess 1138 (see FIG. 6) provided on the left side surface 112c (see FIG. 6) of the tablet PC 100.

Figure 20:
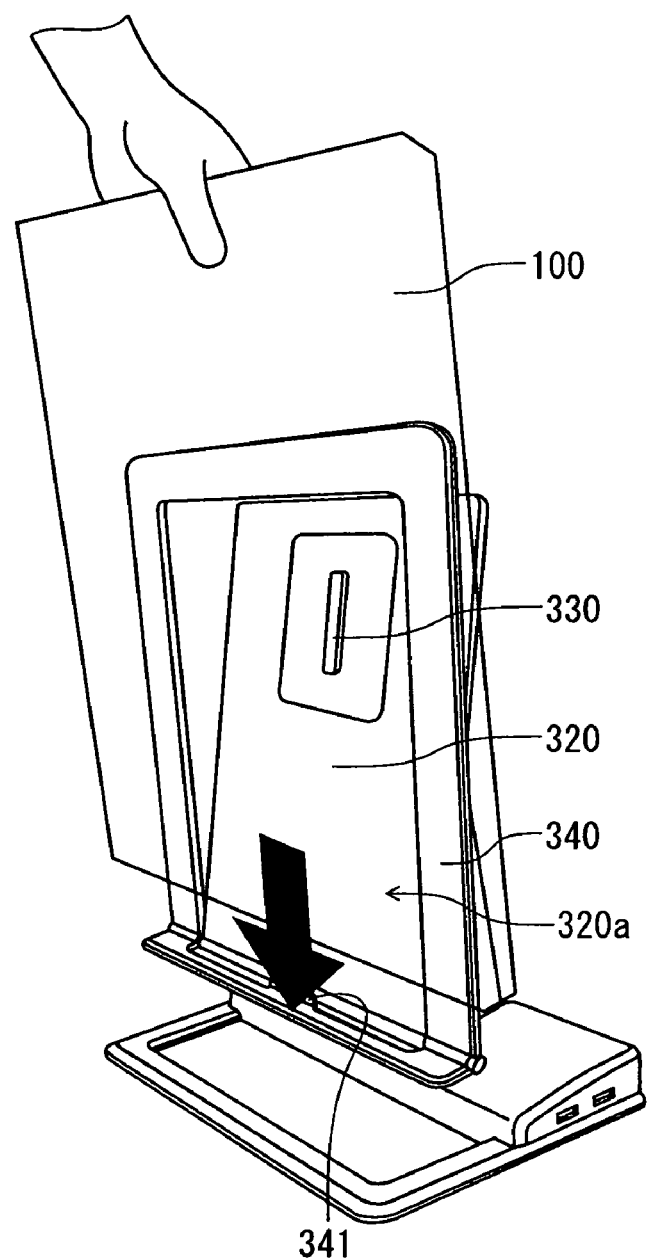
FIG. 20 illustrates an external perspective view showing a separated state.
Figure 21:
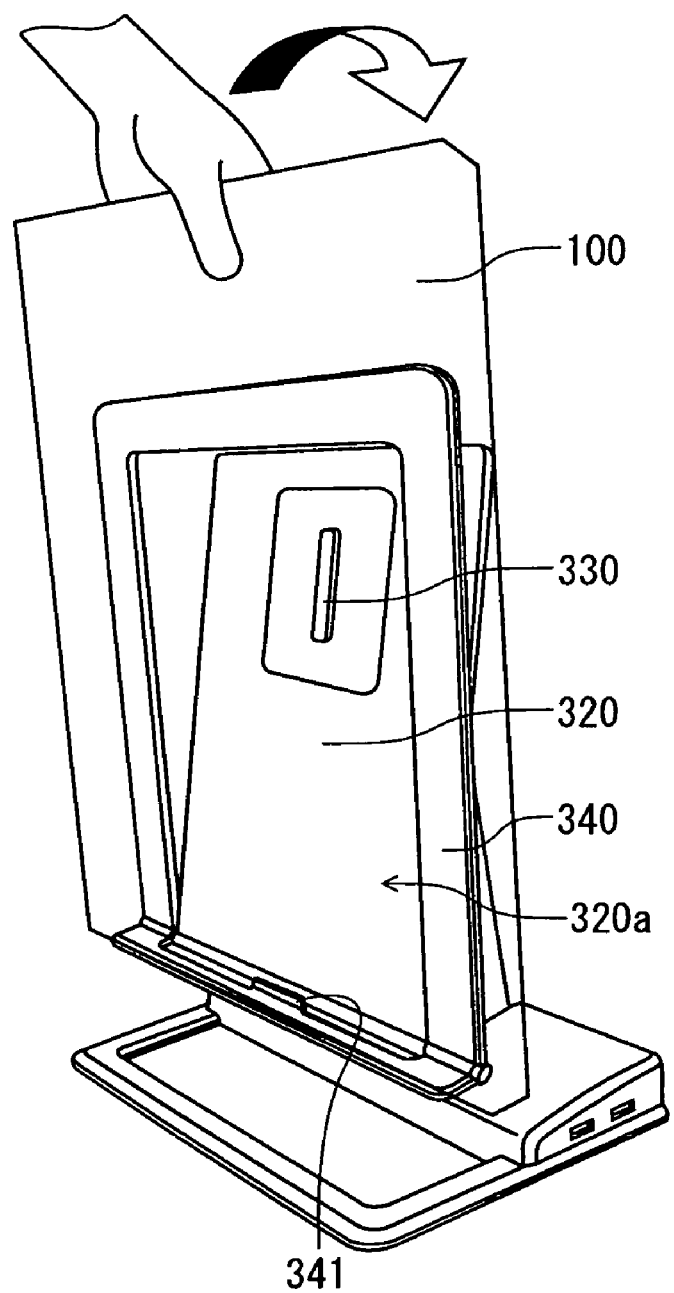
FIG. 21 illustrates an external perspective view showing the state of transition from the separated state to an attached state.
Figure 22:
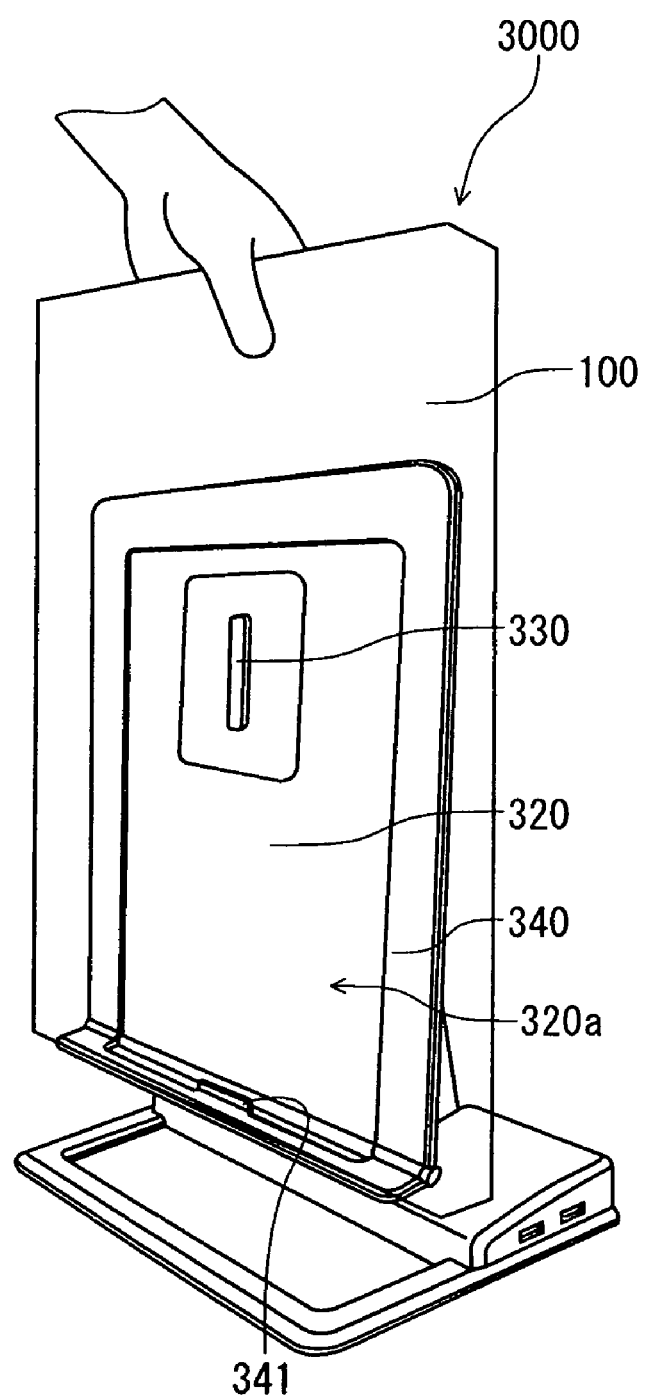
FIG. 22 illustrates an external perspective view of an electronic apparatus system in the attached state.

FIG. 20 is an external perspective view showing a separated state. FIG. 21 is an external perspective view showing the state of transition from the separated state to an attached state. FIG. 22 is an external perspective view of an electronic apparatus system 3000 in the attached state.

As shown in FIGS. 20 to 22, when the tablet PC 100 is attached, the guide member 340 is in contact with both of a part of the lower end surface of this tablet PC 100 and a part of the back surface 115 thereof and turns together with the tablet PC 100. The guide member 340 guides the turn of the tablet PC 100 between the position of the attached state in which the back surface 115 of the tablet PC 100 is in contact with the front surface 320a of the support plate 320 and the docking station connector 1151 on the back surface 115 of the tablet PC 100 is connected to the connector 330 and the position of the separated state in which the back surface 115 of the tablet PC 100 is away from the front surface 320a of the support plate 320 and the docking station connector 1151 of the back surface 115 on the tablet PC 100 is away from the connector 330.

Thus, the tablet PC 100 is certainly positioned relative to the guide member 340.

The guide member 340 is formed to surround the circumference of the support plate 320. Therefore, the area of the guide member 340 being in contact with the back surface 115 of the tablet PC 100 is large, and the guide member 340 can steadily guide the turn of the tablet PC 100.

Figure 23:
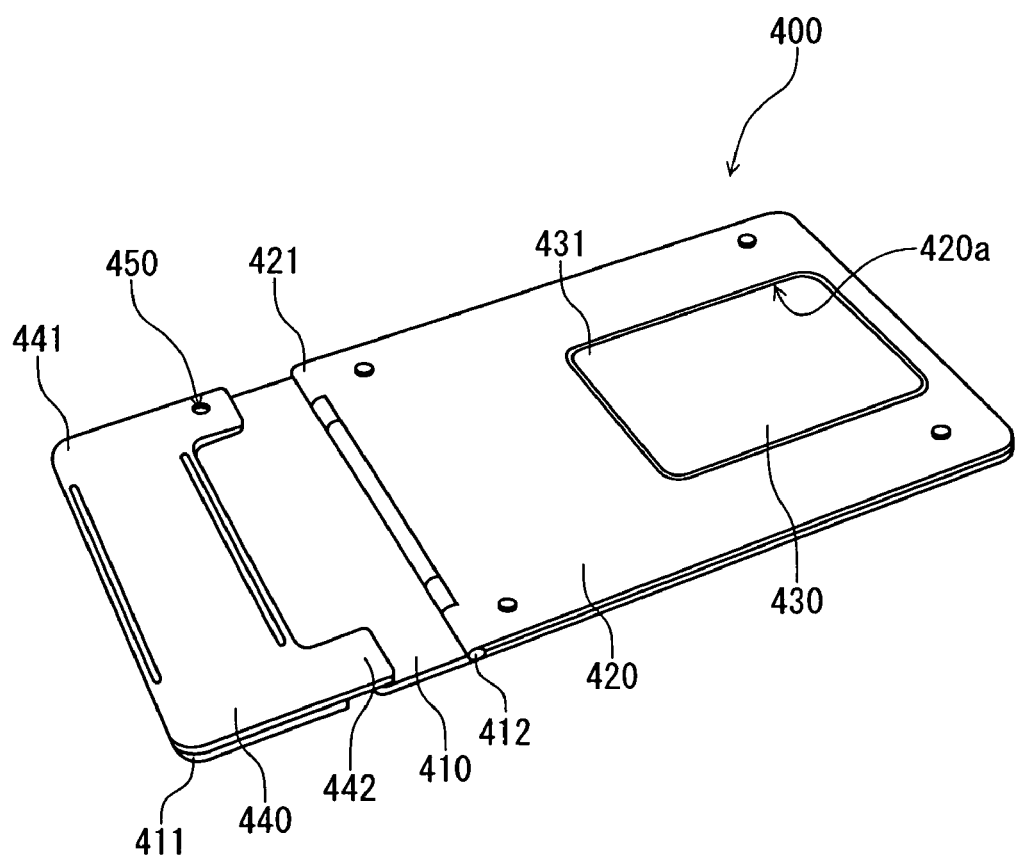
FIG. 23 illustrates an external perspective view of a stand in a folded state seen from obliquely upward on the front side.
Figure 24:
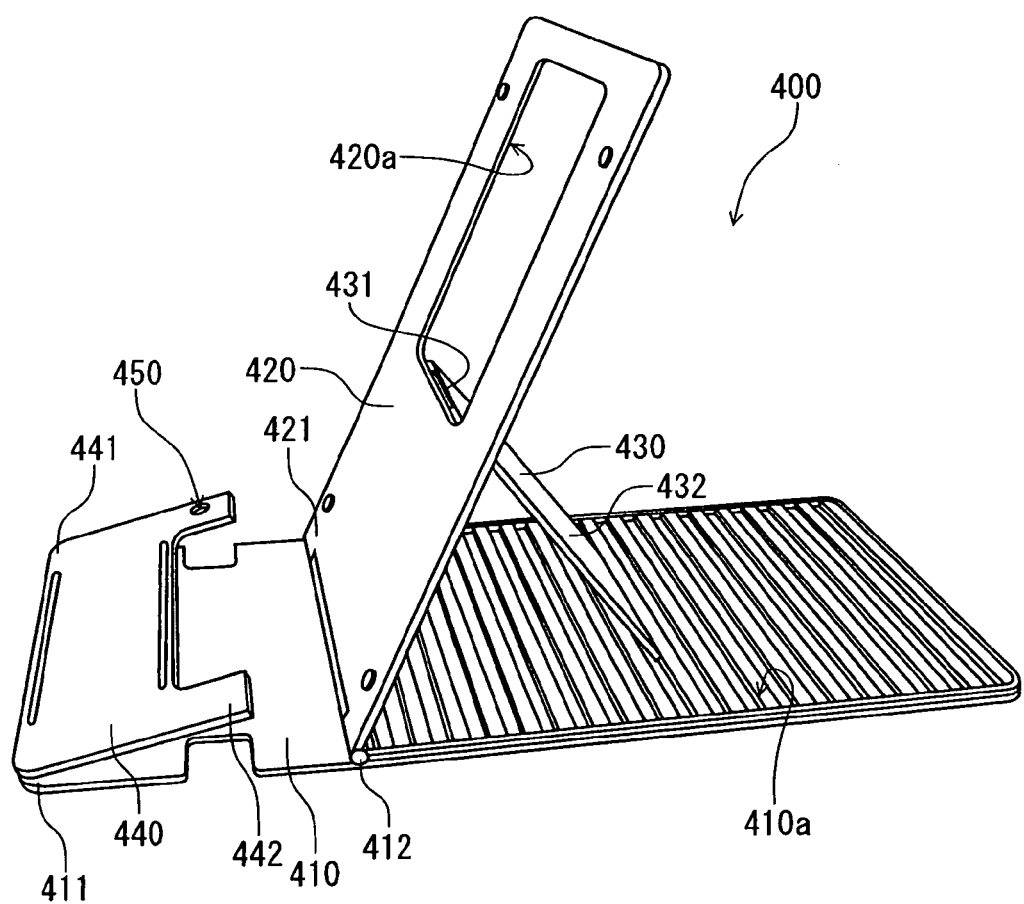
FIG. 24 illustrates an external perspective view of the stand in a developed state seen from obliquely upward on the front side.

FIG. 23 is an external perspective view of a stand 400 in a folded state when it is seen from obliquely upward on the front side. FIG. 24 is an external perspective view of the stand 400 in a developed state when it is seen from obliquely upward on the front side.

The stand 400 shown in FIGS. 23 and 24 is a simplified stand against which the tablet PC 100 described with reference to FIGS. 1 to 7 is to be stood.

As shown in FIGS. 23 and 24, this stand 400 is provided with a base plate 410, a back surface support plate 420, a brace plate 430, and a front surface support plate 440.

The base plate 410 is flatly placed, for example, on a desk. In the stand 400, since this base plate 410 has a concavo-convex shape which laterally extends and longitudinally repeats, and a back end edge 432 of a brace plate 430 to be described later is accepted by a recess 410a of the concavo-convex shape.

A front end edge 421 of the back surface support plate 420 is supported by the base plate 410 in a manner that it can turn around a hinge 412 which laterally extends at a position behind a front end edge 411 of the base plate 410. The back surface support plate 420 can be freely turned between the position of a flatly placed state in which it is flatly placed on the base plate 410 and the positions of multiple raised states in which it is raised obliquely from the base plate 410, and it supports the back surface 115 of the tablet PC 100 while it is in the raised state. Furthermore, the back surface support plate 420 has an opening 420a in which the brace plate 430 to be described later is fitted during the flatly placed state.

Thus, the stand 400 is prevented from taking a lot of space when the back surface support plate 420 is folded, and the user can carry the stand 400 compactly.

A front end edge 431 of the brace plate 430 is supported by the back surface support plate 420 in a manner that it can freely turn around an axis when the back surface support plate 420 is in the flatly placed state, and the brace plate 430 is formed to be fit in the opening 420a formed in the back surface support plate 420. When the back surface support plate 420 is in the flatly placed state, the brace plate 430 is flatly overlapped with the back surface support plate 420 and the base plate 410. When the back surface support plate 420 is in the raised state, the brace plate 430 intervenes between the back surface support plate 420 and the base plate 410 by turning and making its back end edge 432 in contact with a recess 410a of the concavo-convex shape formed on the base plate 410 and supports the back surface support plate 420 in the state of being raised against the base plate 410.

Thus, by selecting any recess 410a of the concavo-convex shape and then making the back end edge 432 in contact with the recess 410a to adjust the raised angle, the brace plate 430 can support the back surface support plate 420 with a desired raised angle. Therefore, the user can raise the display screen 120 of the tablet PC 100 which can be stood, by an angle which enables him to easily see the display screen 120 and perform an input operation with the dedicated pen 130, which is very convenient.

The front surface support plate 440 is arranged between the front end edge 411 of the base plate 410 and the front end edge 421 of the back surface support plate 420. The front surface support plate 440, the front end edge 441 of which is supported by the base plate 410 so as to turn around the axis along the front end edge 411 of the base plate 410, turns between the position of the flatly placed state in which it is flatly placed on the base plate 410 and the position of the raised state in which it is raised from the base plate 410 by a predetermined angle. When the front surface support plate 440 is in the raised state, a back end edge 442 of the front surface support plate 440 is in contact with the lower part of the front surface of the tablet PC 100 the back surface 115 of which is supported by the back surface support plate 420 in the raised state, and thereby the front surface support plate 440 supports the lower part of the front surface of the tablet PC 100. The front surface support plate 440 has a through hole 450 for fixing the stand 400 under a keyboard 500 to be described later.

According to the stand 400, each of the base plate 410, the back surface support plate 420, the brace plate 430 and the front surface support plate 440, which are the components of this stand, is flatly overlapped with the base plate when this stand is folded, and thereby, the stand 400 is prevented from taking a lot of space and exhibits an excellent portability.

Figure 25:
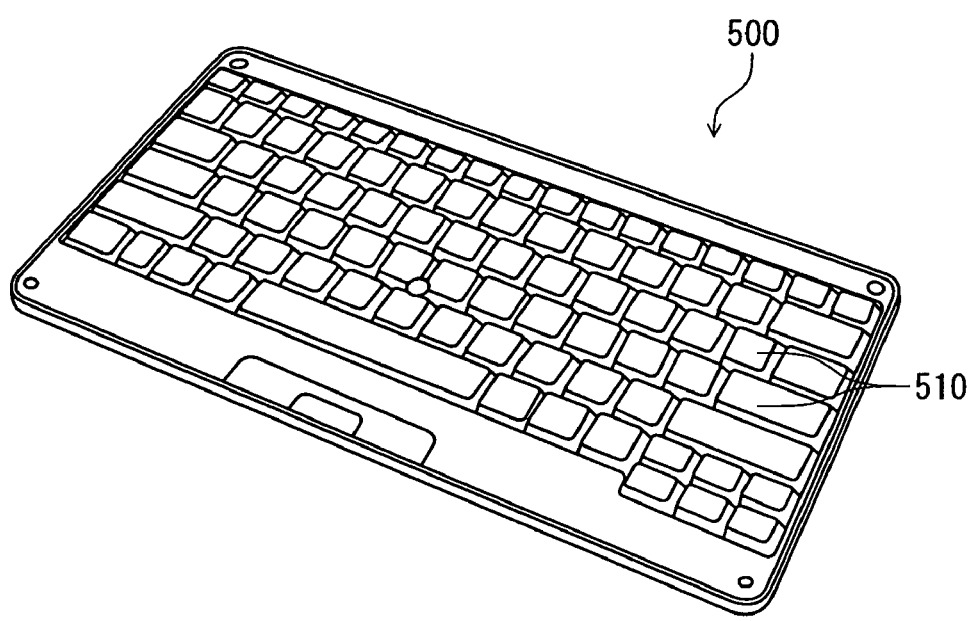
FIG. 25 illustrates an external perspective view of a keyboard seen from obliquely upward on the front side.

FIG. 25 is an external perspective view of a keyboard 500 when it is seen from obliquely upward on the front side.

The keyboard 500 shown in FIG. 25 is a wireless keyboard on which operation keys 510 are arrayed at the front and which wirelessly sends to the tablet PC 100 key input information accompanying a key operation.

Figure 26:
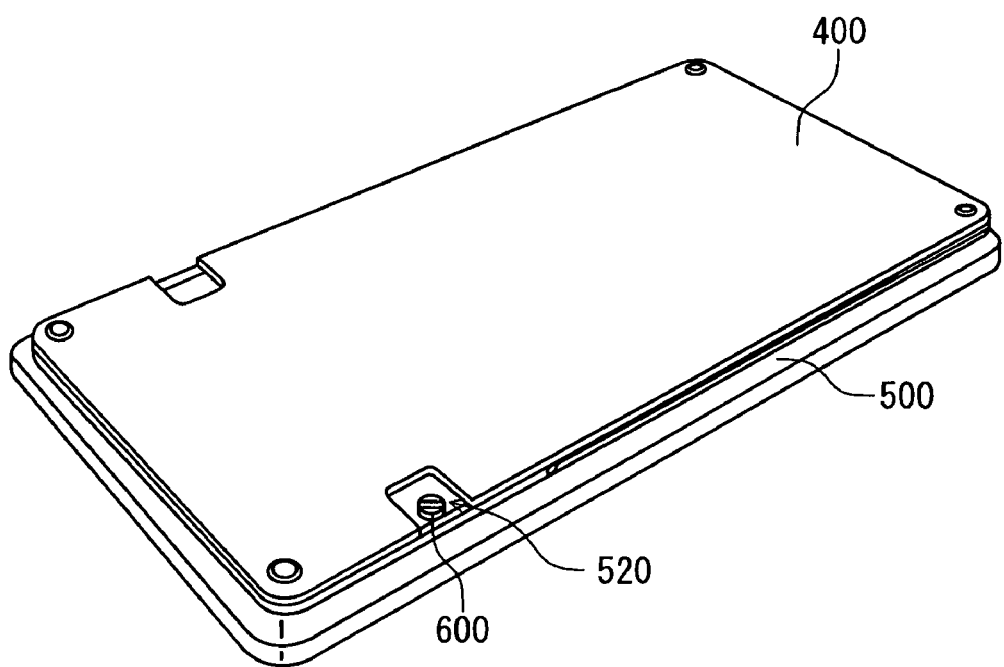
FIG. 26 illustrates an external perspective view showing the state of the stand being fixed under the keyboard shown in FIG. 25 with a screw when it is seen from obliquely upward on the back side.

FIG. 26 is an external perspective view showing the state of the stand 400 being fixed under the keyboard 500 shown in FIG. 25 with a screw 600 when it is seen from obliquely upward on the back side.

As shown in FIG. 26, the keyboard 500 is provided with a screw hole 520 on its back surface. The stand 400 described with reference to FIGS. 23 and 24 can be fixed under the keyboard 500 with the use of the screw hole 520 of the keyboard 500.

Thus, it is possible to prevent the stand 400 from taking a lot of space and secure a high portability even when it is carried together with the keyboard 500.

Figure 27:
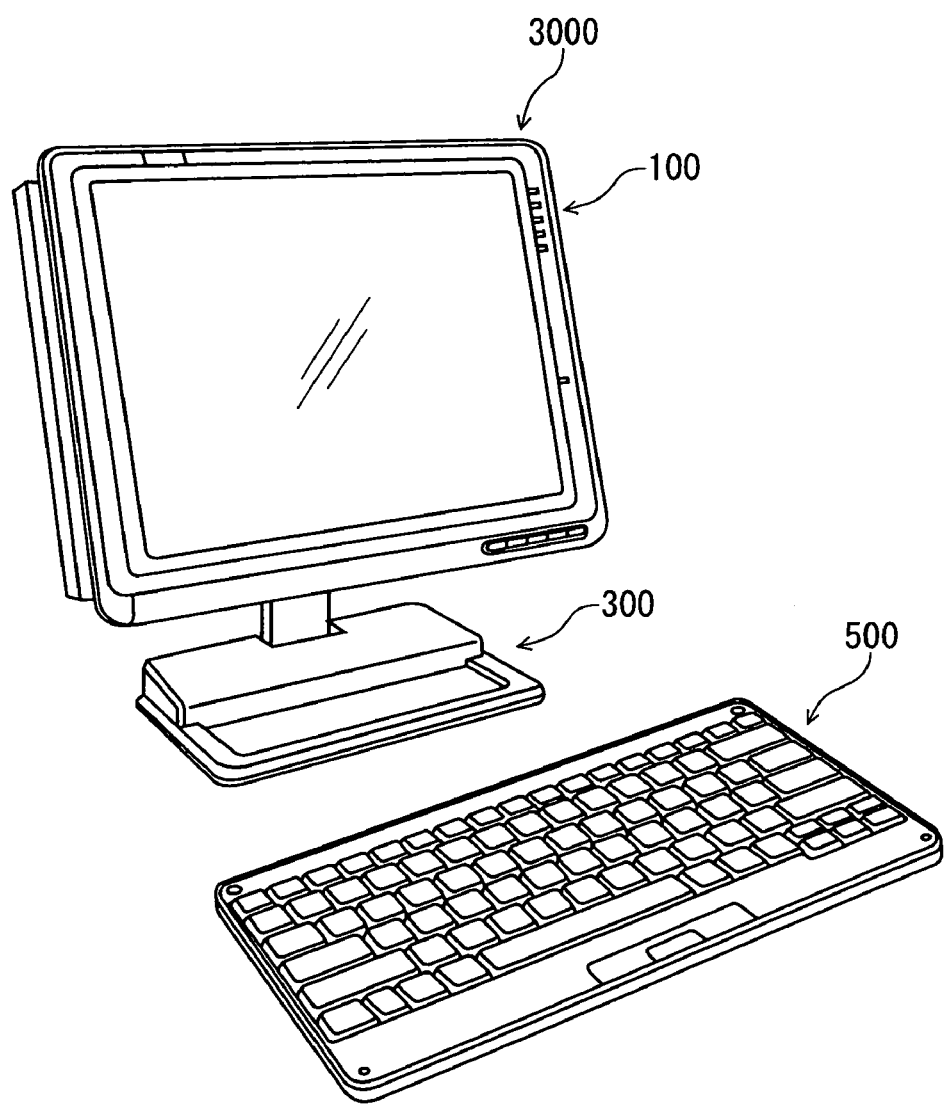
FIG. 27 illustrates an external perspective view showing the state of the keyboard shown in FIG. 26 being that can be used together with the electronic apparatus system with the tablet PC attached to the docking station when it is seen from obliquely upward on the front side.

FIG. 27 is an external perspective view showing the state of the keyboard 500 shown in FIG. 26 being used together with the electronic apparatus system 3000 with the tablet PC 100 attached to the docking station 300 when it is seen from obliquely upward on the front side.

in the use state in which the electronic apparatus system 3000 with the tablet PC 100 attached to the docking station 300, which has been described with reference to FIGS. 14 to 22, is used together with the keyboard 500 with the stand 400 fixed thereunder, the user can operate the keyboard 500 with the stand 400 stored thereunder without feeling uncomfortable because the keyboard 500 and the stand 400 are prevented from taking a lot of space even when the stand 400 is stored under the keyboard 500 as described above.

Figure 28:
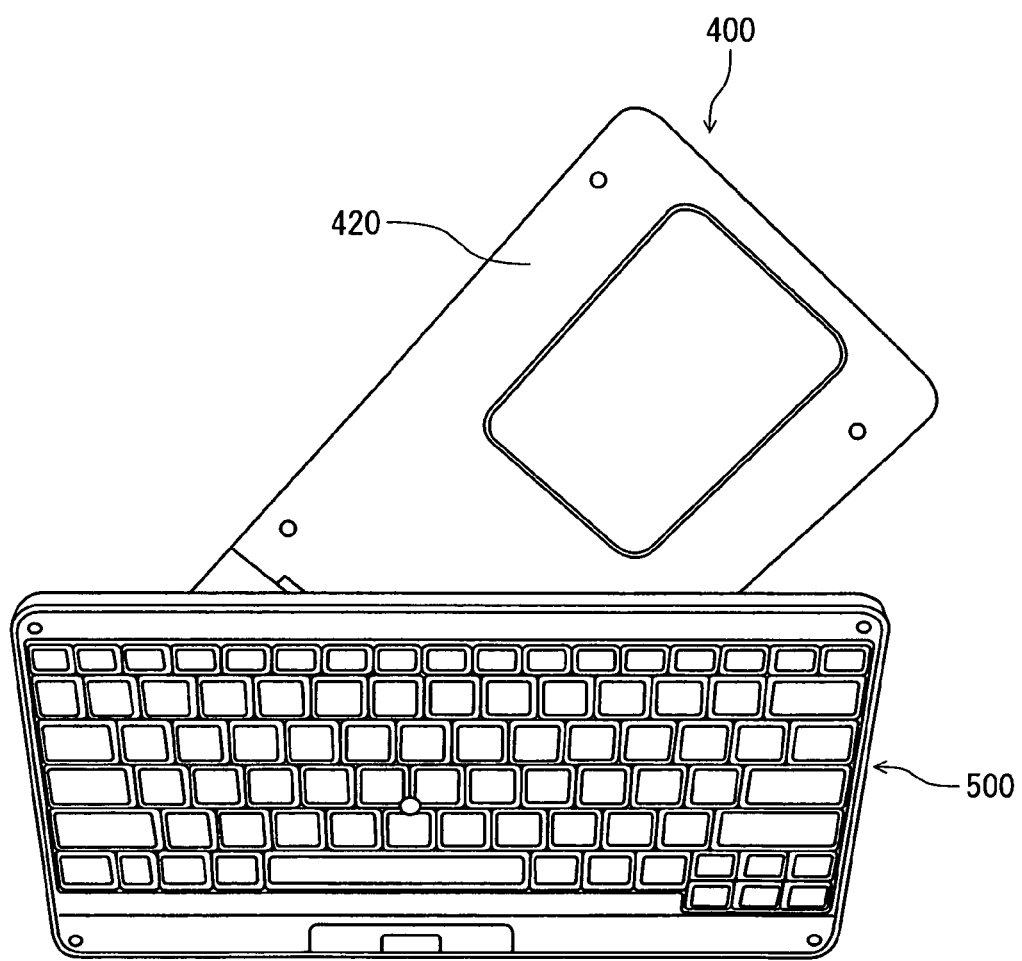
FIG. 28 illustrates an external perspective view showing the state of a process of taking out the back surface support plate of the stand shown in FIG. 26 from under the keyboard when it is seen from obliquely upward on the front side.
Figure 29:
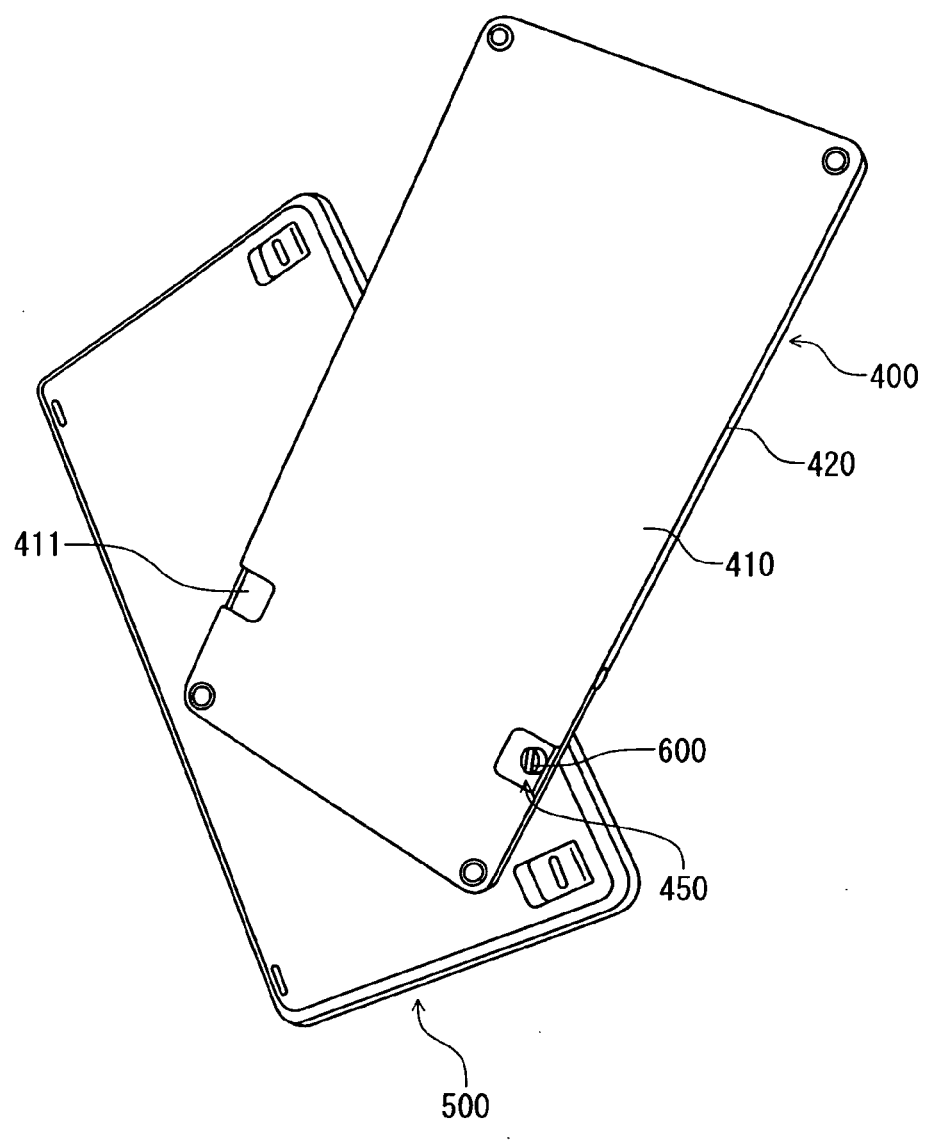
FIG. 29 illustrates an external perspective view showing the state shown in FIG. 28 when it is seen from obliquely upward on the back side.
Figure 30:
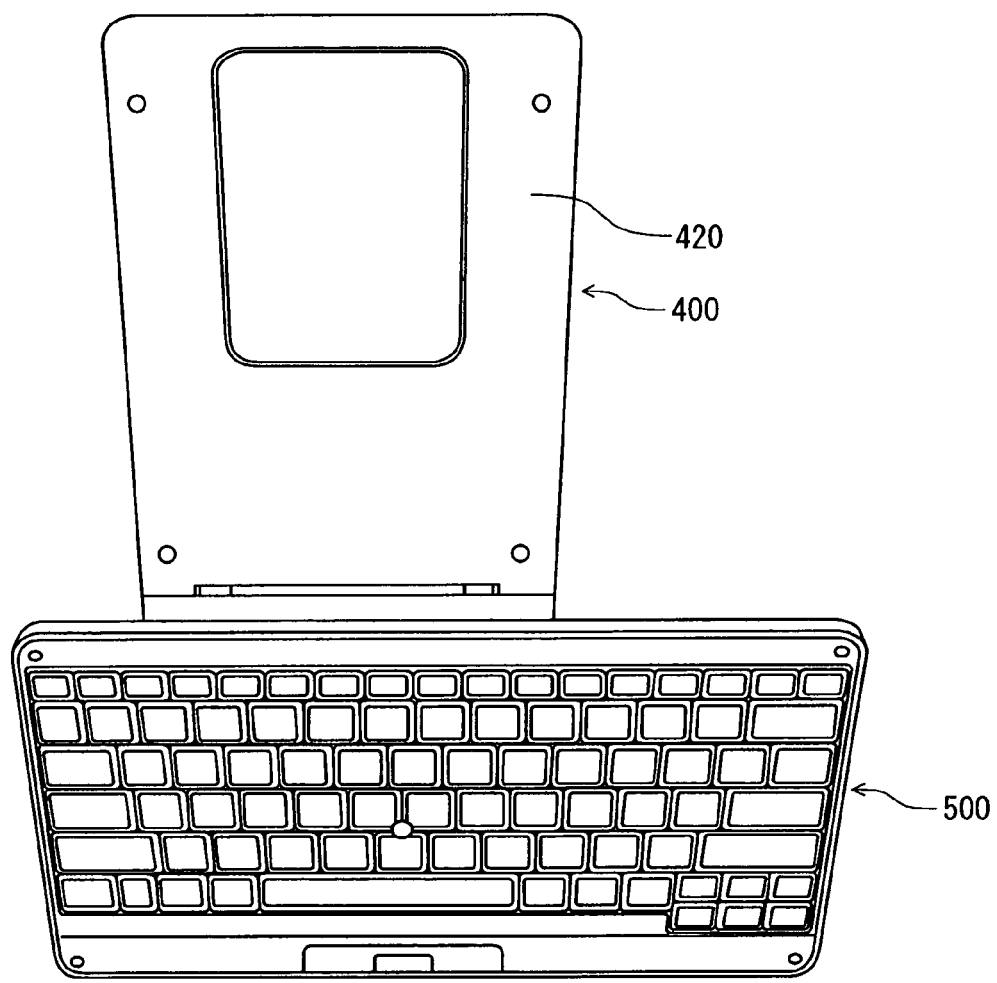
FIG. 30 illustrates an external perspective view showing a use state in which the back surface support plate of the stand shown in FIG. 26 has been taken out from under the keyboard when it is seen from obliquely upward on the front side.
Figure 31:
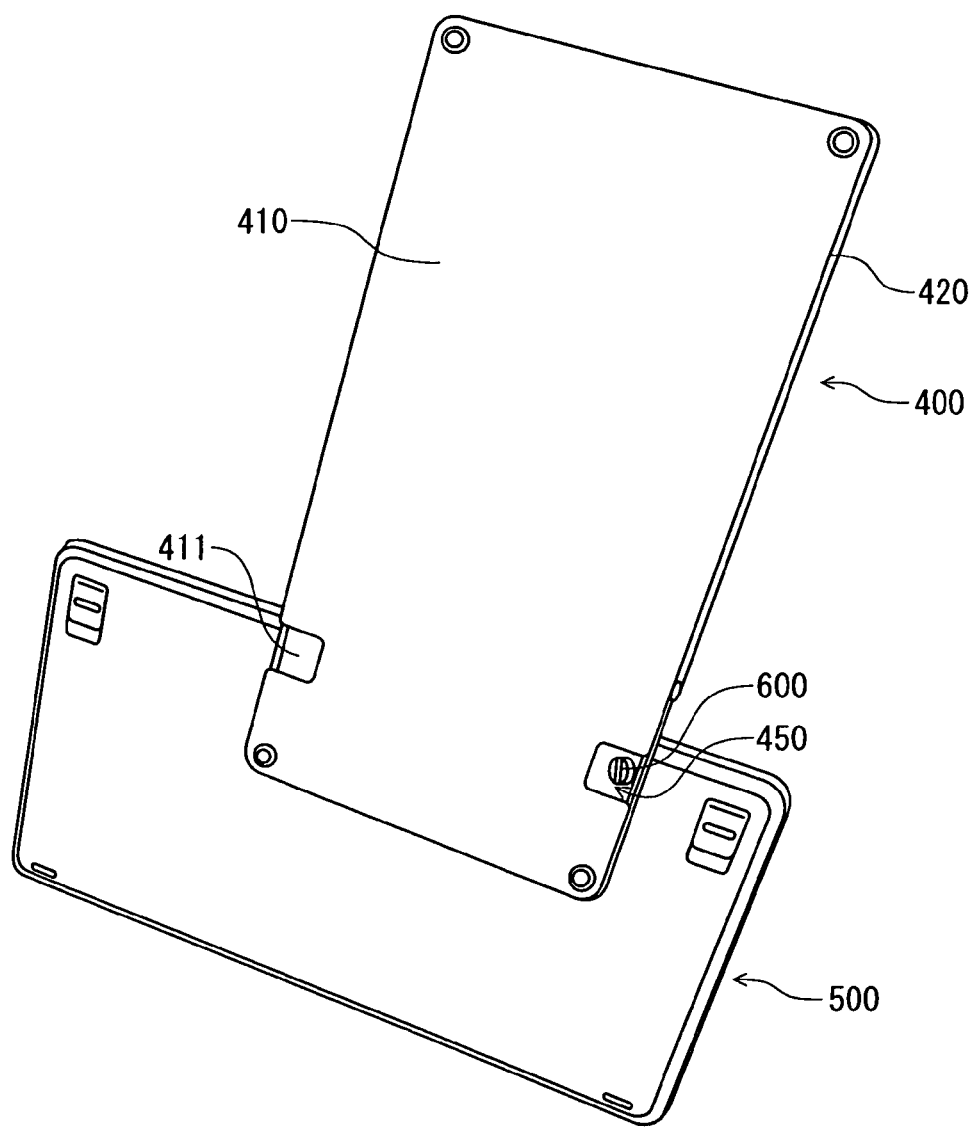
FIG. 31 illustrates an external perspective view showing the use state shown in FIG. 30 when it is seen from obliquely upward on the back side.
Figure 32:
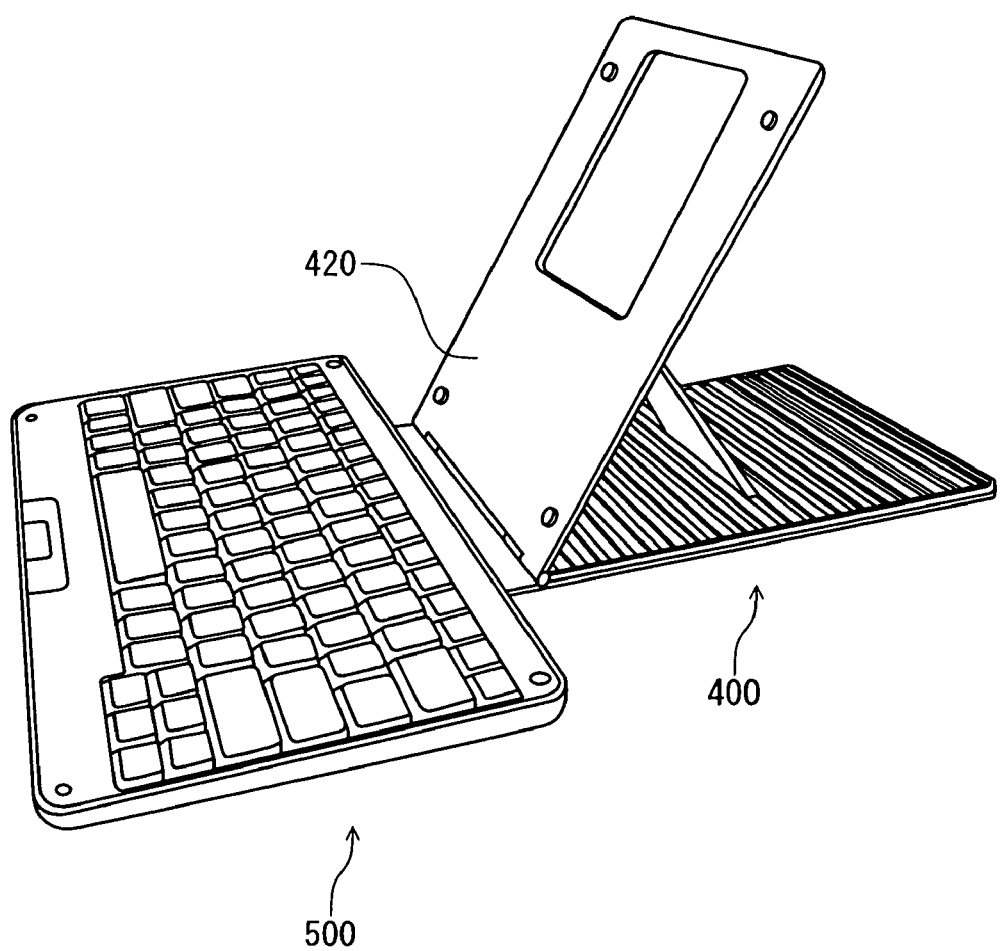
FIG. 32 illustrates an external perspective view showing the use state shown in FIG. 30 with the back surface support plate raised and supported when it is seen from obliquely upward on the front side.

FIG. 28 is an external perspective view showing the state of a process of taking out the back surface support plate 420 of the stand 400 shown in FIG. 26 from under the keyboard 500 when it is seen from obliquely upward on the front side. FIG. 29 is an external perspective view showing the state shown in FIG. 28 when it is seen from obliquely upward on the back side. FIG. 30 is an external perspective view showing a use state in which the back surface support plate 420 of the stand 400 shown in FIG. 26 has been taken out from under the keyboard 500 when it is seen from obliquely upward on the front side. FIG. 31 is an external perspective view showing the use state shown in FIG. 30 when it is seen from obliquely upward on the back side. FIG. 32 is an external perspective view showing the use state shown in FIG. 30 with the back surface support plate 420 raised and supported when it is seen from obliquely upward on the front side.

As shown in FIGS. 28 to 32, the stand 400 has the through hole 450 which enables the stand 400 to turn between the position of the storage state in which the stand 400 is stored under the keyboard 500 with the screw 600 loosened and the position of the use state in which the front end edge 411 of the base plate 410 is left under the keyboard 500 and the back surface support plate 420 is taken out from under the keyboard 500.

Figure 33:
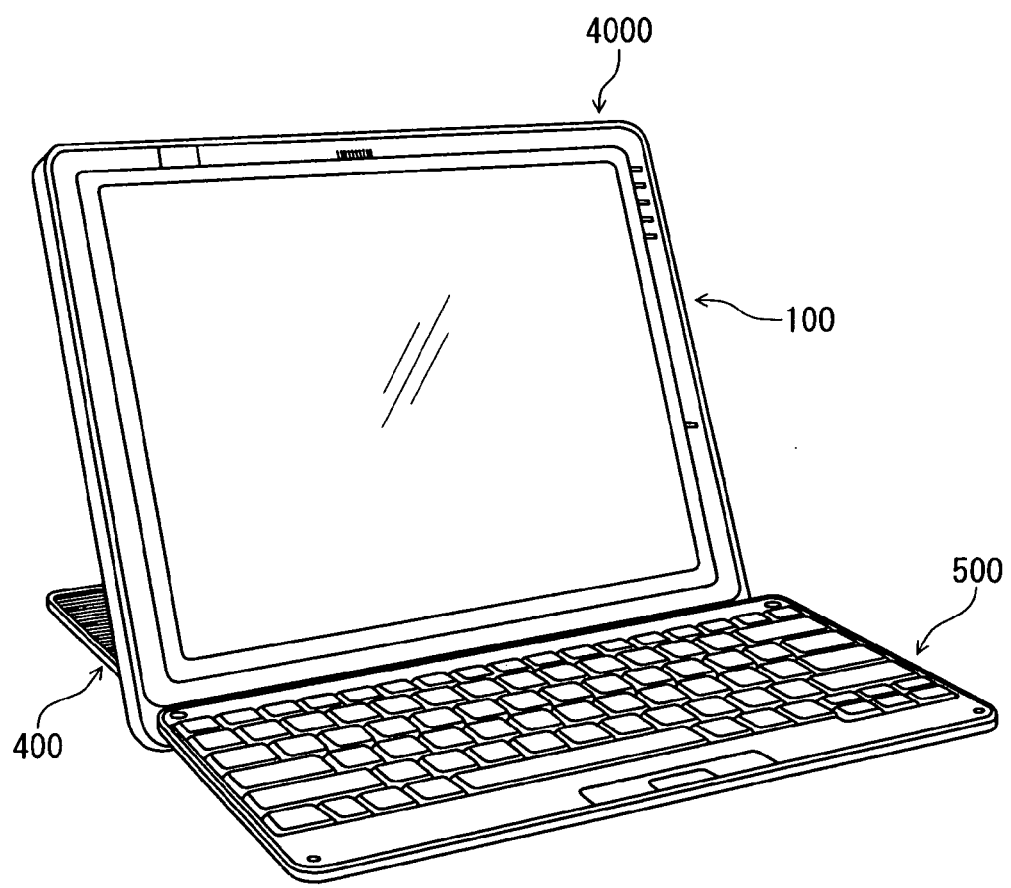
FIG. 33 illustrates an external perspective view of an electronic apparatus system with the tablet PC stood against the stand shown in FIG. 32 when it is seen from obliquely upward on the front side.

FIG. 33 is an external perspective view of an electronic apparatus system 4000 with the tablet PC 100 stood against the stand 400 shown in FIG. 32 when it is seen from obliquely upward on the front side.

Since the stand 400 fixed under the keyboard 500 with the screw 600 has the through hole 450 which enables the stand 400 to turn between the position of the storage state and the position of the use state when the screw 600 is loosened, it is possible to easily take out the back surface support plate 420 of the stand 400 from under the keyboard 500 as necessary, which is very convenient. By raising the back surface support plate 420 taken out from the keyboard 500 and supporting it in the raised state, the tablet PC 100 can be stood against it. The lower part of the front surface of the tablet PC 100 stood against the stand 400 is supported by the back end edge of the keyboard 500 which is in contact therewith, and thereby, the user can use the tablet PC 100 as a notebook computer. Furthermore, since the keyboard 500 is a wireless keyboard, the user can perform a key input operation without wiredly connecting the keyboard 500 and the tablet PC 100, by supporting the back surface support plate 420 of the stand 400 in the raised state and simply standing the tablet PC 100 against the stand 400, which is very convenient.

Though, in the above embodiment, description has been made on a tablet PC as an example of an electronic apparatus, the electronic apparatus is not limited to the tablet PC, and a palm-sized type electronic apparatus with a limited processing power is also possible.

Though, in the above embodiment, description has been made on a detector which detects both of scroll information corresponding to a sliding operation with a finger by an operator and scroll information corresponding to a sliding operation with a pen by an operator, the detector is not limited thereto, and any detector that detects scroll information corresponding to a sliding operation by an operator may be used.

Though, in the above embodiment, description has been made on a detectors to be arranged at both of a part where the groove of the groove part longitudinally extends and a part where the groove of the groove part laterally extends and arranged near at least one corner of the four corners of the display screen, as an example, this is not limiting, and the detector may be arranged at any position of the groove part.

Though, in the above embodiment, description has been made on an example in which the brace plate of the stand is supported by the back surface support plate in a manner that it can freely turn around an axis, the brace plate is not limited thereto, and any brace plate is possible that is supported by any one of the back surface support plate and the base plate in a manner that it can freely turn around an axis.

Though, in the above embodiment, description has been made on an example in which the base plate of the stand has a concavo-convex shape which laterally extends and longitudinally repeats so that the back end edge of the brace plate is accepted by a recess of the concavo-convex shape, the base plate is not limited thereto, and any base plate is possible that has support parts supporting the back end edge of the brace plate at multiple positions in the longitudinal direction.

Though, in the above embodiment, description has been made on such a stand that the back surface support plate has an opening and the brace plate is fit in the opening when it is flatly placed, as an example, the stand is not limited thereto, and any stand is possible if the back surface support plate and the brace plate are prevented from being overlapped with each other so that both of the flatly placed back surface support plate and the brace plate are arranged directly on the base plate.

Though, in the above embodiment, description has been made on an example in which the keyboard is a wireless keyboard, the keyboard is not limited thereto, and any kind of keyboard is possible.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A connecting device for detachably holding an electronic apparatus and serving as an interface for a signal input/output between the electronic apparatus and at least one external device, the electronic apparatus having a housing formed in a plate shape, a display screen provided on a front surface of the housing and a signal input/output terminal provided on a back surface of the housing, the connecting device comprising:
   a base portion;
   a support plate coupled with the base portion so as to freely turn around a perpendicular line to the surface of the support plate;
   a connector that can be provided on the surface of the support plate and to which the signal input/output terminal is connected; and
   a guide member that is supported by the lower end of the support plate so as to freely turn in the direction of moving close to and away from the support plate with the lower end as the axis and that is in contact with both of a part of the lower end surface and a part of the back surface of the electronic apparatus when the electronic apparatus is attached, the guide member turning together with the electronic apparatus and guiding the turn of the electronic apparatus between the position of an attached state in which the back surface of the electronic apparatus is in contact with the surface of the support plate and the signal input/output terminal on the back surface of the electronic apparatus is connected to the connector and the position of a separated state in which the back surface of the electronic apparatus is away from the surface of the support plate and the signal input/output terminal on the back surface of the electronic apparatus is away from the connector; wherein
   the connector is tiltable in the same direction as the turn direction of the electronic apparatus guided by the guide member.

2. The connecting device according to claim 1, wherein the guide member includes an engage portion to be engaged with a part of the lower end surface of the electronic apparatus.

3. The connecting device according to claim 1, wherein the base portion includes a connection terminal to be connected to the external device.

4. The connecting device according to claim 1, wherein electronic apparatus includes a display screen having a pen input function for detecting contact or closeness of a pen, on the front surface of the housing; and the connecting device detachably holds the electronic apparatus provided with the display screen having the pen input function and serves as an interface for signal input/output between the electronic apparatus and an external device.

5. An electronic apparatus system comprising:
an electronic apparatus having a housing formed in a plate shape, a display screen provided on the front surface of the housing, and a signal input/output terminal provided on the back surface of the housing; and
a connecting device detachably holding the electronic apparatus and serving as an interface for a signal input/output between the electronic apparatus and an external device; wherein
the connecting device comprises:
   a support plate coupled with a base portion so as to freely turn around a perpendicular line to the surface of the support plate;
   a connector that can be provided on the surface of the support plate and to which the signal input/output terminal is connected; and
   a guide member that is supported by the lower end of the support plate so as to freely turn in the direction of moving close to and away from the support plate with the lower end as the axis and that is in contact with both of a part of the lower end surface and a part of the back surface of the electronic apparatus when the electronic apparatus is attached, the guide member turning together with the electronic apparatus and guiding the turn of the electronic apparatus between the position of an attached state in which the back surface of the electronic apparatus is in contact with the surface of the support plate and the signal input/output terminal on the back surface of the electronic apparatus is connected to the connector and the position of a separated state in which the back surface of the electronic apparatus is away from the surface of the support plate and the signal input/output terminal on the back surface of the electronic apparatus is away from the connector; wherein
the connector is tiltable in the same direction as the turn direction of the electronic apparatus guided by the guide member.

6. The electronic apparatus system according to claim 5, wherein the guide member includes an engage portion to be engaged with a part of the lower end surface of the electronic apparatus.

7. The electronic apparatus system according to claim 5, wherein the base portion includes a connection terminal to be connected to an external device.

8. The electronic apparatus system according to claim 5, wherein
electronic apparatus includes a display screen having a pen input function for detecting contact or closeness of a pen, on the front surface of the housing; and
the connecting device detachably holds the electronic apparatus provided with the display screen having the pen input function and serves as an interface for signal input/output between the electronic apparatus and the external device.

* * * * *